United States Patent
Takahashi et al.

(10) Patent No.: US 8,780,269 B2
(45) Date of Patent: Jul. 15, 2014

(54) CONTENTS PLAYBACK DEVICE, TELEVISION RECEIVER, INFORMATION PROVISION SYSTEM, INFORMATION PROVISION METHOD, INFORMATION PROVISION PROGRAM, AND RECORDING MEDIUM

(75) Inventors: Shigeki Takahashi, Osaka (JP); Daiki Ogasawara, Osaka (JP); Katsuo Doi, Osaka (JP); Yasunori Yamashita, Osaka (JP); Masafumi Hirata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/007,939

(22) PCT Filed: Apr. 2, 2012

(86) PCT No.: PCT/JP2012/058794
§ 371 (c)(1),
(2), (4) Date: Sep. 26, 2013

(87) PCT Pub. No.: WO2012/133882
PCT Pub. Date: Oct. 4, 2012

(65) Prior Publication Data
US 2014/0016036 A1    Jan. 16, 2014

(30) Foreign Application Priority Data
Mar. 31, 2011 (JP) ................. 2011-081172

(51) Int. Cl.
*H04N 5/445* (2011.01)
*H04N 7/08* (2006.01)

(52) U.S. Cl.
CPC ..................... *H04N 7/08* (2013.01); *H04N 5/44513* (2013.01)

USPC .......... 348/473; 348/461; 348/563; 348/465; 725/136

(58) Field of Classification Search
CPC ............................. H04N 5/44513; H04N 7/08
USPC ................. 348/563, 465, 460, 461, 468, 473; 725/136

See application file for complete search history.

(56) References Cited

U.S. PATENT DOCUMENTS

| | | |
|---|---|---|
| 6,477,353 B1 | 11/2002 | Honda et al. |
| 2003/0204858 A1 | 10/2003 | Nakamura |

(Continued)

FOREIGN PATENT DOCUMENTS

| | | |
|---|---|---|
| JP | 11-306488 A | 11/1999 |
| JP | 2001-144701 A | 5/2001 |

(Continued)

OTHER PUBLICATIONS

International Search Report for PCT/JP2012/058794 mailed on Jun. 26, 2012.

*Primary Examiner* — Jefferey Harold
*Assistant Examiner* — Jean W Desir
(74) *Attorney, Agent, or Firm* — Birch, Stewart, Kolasch & Birch, LLP

(57) ABSTRACT

A television (100) includes: a receiving section (202) for receiving additional information which is added to and transmitted along with a broadcast content; a processing section (222) for processing additional information so that a mobile device (120) can obtain information that is specific to unique information which the television (100) has; and a transmitting section (224) for transmitting processed additional information.

6 Claims, 23 Drawing Sheets

(56) References Cited

U.S. PATENT DOCUMENTS

| | | | |
|---|---|---|---|
| 2004/0034875 A1* | 2/2004 | Bulkowski et al. | 725/136 |
| 2007/0162440 A1 | 7/2007 | Gutta et al. | |

FOREIGN PATENT DOCUMENTS

| | | |
|---|---|---|
| JP | 2001-309350 A | 11/2001 |
| JP | 2002-353925 A | 12/2002 |
| JP | 2003-324664 A | 11/2003 |
| JP | 2003-345696 A | 12/2003 |
| JP | 2006-74801 A | 3/2006 |
| JP | 2006-109278 A | 4/2006 |
| JP | 2007-515712 A | 6/2007 |
| JP | 2008-5320 A | 1/2008 |
| JP | 2008-167018 A | 7/2008 |
| JP | 2009-152668 A | 7/2009 |

* cited by examiner

Extended Additional Information

| Name | Japanese-Style Restaurant MIYABI |
|---|---|
| Address | 1-3-2 YY, XX-ku, Tokyo |
| Phone number | 03-1234-5678 |
| Image | miyabi.jpg |
| Notes | An exceptional place of peace and tranquility is waiting for you in the midst of the city. Escape the busyness and enjoy fine cuisine! Click </ref addr="http://ryoutei.miyabi.ne.jp/top.html">here </ref> for details and reservation |

(b)

```
<?xml version="1.0" encoding="Shift_JIS" ?>
<?xml-stylesheet type="text/xsl" href="shop.xsl" ?>
<shops title="Japanese-Style Restaurant MIYABI">
    <shop isbn="ISBN4-87966-936-9">
        <name>Japanese-Style Restaurant MIYABI</name>
        <address>1-3-2 YY, XX-ku, Tokyo</address>
        <phone>03-1234-5678</phone>
        <logo>miyabi.jpg</logo>
        <memo>An exceptional place of peace and tranquility is waiting for you in the midst of the city. Escape the
busyness and enjoy fine cuisine! Click </ref addr="http://ryoutei.miyabi.ne.jp/top.html">here </ref> for details and
reservation</memo>
    </shop>
</shops>
```

Today's Restaurant Information

Japanese-Style Restaurant MIYABI
 1-3-2 YY, XX-ku, Tokyo
 03-1234-5678

An exceptional place of peace and
tranquility is waiting for you in the
midst of the city. Escape the
busyness and enjoy fine cuisine!
Click here for details and reservation.

Extended Additional Information

| Dealer Affiliation | Dealer | Address | Phone Number | Regular Holiday | URL |
|---|---|---|---|---|---|
| Dealer of XXX | Dealer of ABC City | 123 ABC-cho, XX City, XX Prefecture | 012-345-6789 | Monday | http://ooocar.com/OOO/abc/ |
| Dealer of YYY | Dealer of ABC City | 234 ABC-cho, XX City, XX Prefecture | 012-345-7878 | Tuesday | http://ooocar.com/AAA/abc/ |
| Dealer of ZZZ | Dealer of DEF City | 356-1 DEF-cho, XX City, XX Prefecture | 012-346-1234 | Wednesday | http://ooocar.com/XXX/def/ |
| Dealer of XYZ | Dealer of GHI City | 56-78 GHI-cho, XX City, XX Prefecture | 012-347-8989 | Thursday | http://ooocar.com/OAX/ghi/ |

(b)

Extended Additional Information

| Dealer Affiliation | Dealer | Address | Phone Number | Regular Holiday | URL | Distance |
|---|---|---|---|---|---|---|
| Dealer of XXX | Dealer of ABC City | 123 ABC-cho, XX City, XX Prefecture | 012-345-6789 | Monday | http://ooocar.com/OOO/abc/ | 1.5km |
| Dealer of YYY | Dealer of ABC City | 234 ABC-cho, XX City, XX Prefecture | 012-345-7878 | Tuesday | http://ooocar.com/AAA/abc/ | 1.8km |

(c)

```
<?xml version="1.0" encoding="Shift_JIS" ?>
<?xml-stylesheet type="text/xsl" href="dealer.xsl" ?>
<dealers title="List of Dealers of xxx motors">
<owner address="XXXXXXX@000car.com">xxx motors</owner>

<dealer channel="Dealer of XXX">
                <name>Dealer of ABC City</name>
                <address>123 ABC-cho, XX City, XX Prefecture</address>
                <category>Car</category>
                <url>http://000car.com/000/abc/</url>
                <distance>1.5</distance>
                <telephone>012-345-6789</telephone>
                <day>Monday</day>
        </dealer>

<dealer channel="Dealer of YYY">
                <name>Dealer of ABC City</name>
                <address>234 ABC-cho, XX City, XX Prefecture</address>
                <category>Car</category>
                <url>http://000car.com/AAA/abc/</url>
                <distance>1.8</distance>
                <telephone>012-345-7878</telephone>
                <day>Tuesday</day>
        </dealer>

</dealers>
```

FIG. 10

List of Dealers of xxx Motors

| Dealer Affiliation | Dealer | Address | Phone Number | Distance | Regular Holiday |
|---|---|---|---|---|---|
| Dealer of XXX | Dealer of ABC City | 123 ABC-Cho, XX City, XX Prefecture | 012-345-6789 | 1.5km | Monday |
| Dealer of YYY | Dealer of ABC City | 234 ABC-Cho, XX City, XX Prefecture | 012-345-7878 | 1.8km | Tuesday |

| Extended Additional Information | | |
|---|---|---|
| Departure Point | Name | XX Station |
| | Address | ... XX City, XX Prefecture |
| Stop | Name | XX Spring |
| | Address | ... XX City, XX Prefecture |
| Destination Point | Name | XX Hotel |
| | Address | ... XX City, XX Prefecture |

(b)

| Extended Additional Information | | |
|---|---|---|
| Current Location | ... yy City, yy Prefecture | |
| Departure Point | Name | XX Station |
| | Address | ... XX City, XX Prefecture |
| Stop | Name | XX Spring |
| | Address | ... XX City, XX Prefecture |
| Destination Point | Name | XX Hotel |
| | Address | ... XX City, XX Prefecture |

| Unique Information Storing Section | |
|---|---|
| Genre | Television Program Name |
| Drama | Korean Drama |
| News | Economy News |
| Sports | Baseball News |

| Extended Additional Information | | | |
|---|---|---|---|
| Item 1 | Item Name | Korean Seaweed | |
| | Production Location | South Korea | |
| | URL | http://www··· | |
| | Image | nori.jpg | |
| Item 2 | Item Name | Cod Roe | |
| | Production Location | Hakata | |
| | URL | http://www··· | |
| | Image | mentai.jpg | |
| Item 3 | Item Name | Crab | |
| | Production Location | Hokkaido | |
| | URL | http://www··· | |
| | Image | kani.jpg | |

(b)

| Extended Additional Information | | |
|---|---|---|
| Item 1 | Item Name | Korean Seaweed |
| | Production Location | South Korea |
| | URL | http://www··· |
| | Image | nori.jpg |

FIG. 20

Unique Information Storing Section

| Television Program Name | Appearing Individuals |
|---|---|
| Korean Drama A | Person A, Person B, Person C |
| Korean Hit Songs | Person A, Person D, Person E |

FIG. 21

Extended Additional Information

| | | |
|---|---|---|
| Television Program Information 1 | Television Program Name | Quiz |
| | URL | http://www... |
| | Appearing Individuals | Person B, Person F |
| Television Program Information 2 | Television Program Name | Idol |
| | URL | http://www... |
| | Appearing Individuals | Person A, Person J |
| Television Program Information 3 | Television Program Name | Entertainment News |
| | URL | http://www... |
| | Appearing Individuals | Person A, Person H |

FIG. 22

| Unique Information Storing Section | |
|---|---|
| Genre | Television Program Name |
| Korean Drama | Korean Drama A |

| | |
|---|---|
| Name Of Program Currently Broadcast | Korean Drama A Episode 4 |

| Extended Additional Information | | |
|---|---|---|
| Television Program Information 1 | Television Program Name | Korean Drama A Episode 1 |
| | URL | http://www··· |
| Television Program Information 2 | Television Program Name | Korean Drama A Episode 2 |
| | URL | http://www··· |
| Television Program Information 3 | Television Program Name | Korean Drama A Episode 3 |
| | URL | http://www··· |

FIG. 24

| Extended Additional Information | | |
|---|---|---|
| Television Program Information A | Television Program Name | Weekend Cinema |
| | Genre | Movie |
| | URL | http://www··· |
| Television Program Information B | Television Program Name | Korean Drama B |
| | Genre | Korean Drama |
| | URL | http://www··· |
| Television Program Information C | Television Program Name | Professional Baseball 1st Match |
| | Genre | Sports |
| | URL | http://www··· |

FIG. 25

Unique Information Storing Section

| Genre | Television Program Name |
|---|---|
| Korean Drama | Korean Drama A |

| Name Of Program Currently Broadcast | Korean Drama A Episode 4 |
|---|---|

| Current Date And Time | 2011-01-01 14:00 |
|---|---|

| Extended Additional Information | | | |
|---|---|---|---|
| Prize Drawing Information 1 | Television Program Name | Korean Drama A Episode 1 | |
| | Period Of Validity | 2010-11-30 | |
| | URL | http://www··· | |
| Prize Drawing Information 2 | Television Program Name | Korean Drama A Episode 2 | |
| | Period Of Validity | 2011-01-15 | |
| | URL | http://www··· | |
| Prize Drawing Information 3 | Television Program Name | Korean Drama A Episode 3 | |
| | Period Of Validity | 2011-01-31 | |
| | URL | http://www··· | |

FIG. 27

Unique Information Storing Section

| Current Time | 14:00 |
|---|---|
| Name Of Program Currently Broadcast | Drive Go! |

| Extended Additional Information | | | |
|---|---|---|---|
| Exclusive Information 1 | Name Of Television Program | Drive Go! | |
| | Transmission Time | 14:25 | |
| | Exclusive Information | Text | Exclusive To Audience!! ... |
| | | URL | http://www・・・ |
| | | Image | present.jpg |

CONTENTS PLAYBACK DEVICE, TELEVISION RECEIVER, INFORMATION PROVISION SYSTEM, INFORMATION PROVISION METHOD, INFORMATION PROVISION PROGRAM, AND RECORDING MEDIUM

TECHNICAL FIELD

The present invention relates to (i) a content playback device, (ii) a television receiver, (iii) an information providing system (information provision system), (iv) a method for providing information (information provision method), (v) an information providing program (information provision program), and (vi) a storage medium (recording medium), any of which is capable of providing an external device with additional information received along with a broadcast content.

BACKGROUND ART

In recent years, digital broadcasting has become more and more prevalent. Along with the prevalence of digital broadcasting, broadcast waves of digital broadcasting are increasingly supplied with a variety of information (hereinafter referred to as "additional information") such as information for use in data broadcasting. This allows a television receiver, which receives such broadcast waves, to not only play a television program but also provide a user with additional information by, for example, displaying the additional information. Examples of additional information encompass a variety of information such as (i) information concerning a television program, (ii) news, and (iii) weather forecast.

Some television receivers are equipped with capability to transfer such additional information to a mobile device carried by a user. This allows the user to view the additional information on his/her mobile device. Patent Literature 1, for example, discloses an information filtering system that (i) receives multimedia information which is broadcast in digital broadcasting and then (ii) transfers the multimedia information to a mobile device.

CITATION LIST

Patent Literature

Patent Literature 1
Japanese Patent Application Publication, Tokukai, No. 2001-144701 A (Publication Date: May 25, 2001)

SUMMARY OF INVENTION

Technical Problem

According to the technology disclosed in Patent Literature 1, multimedia information is filtered for a reduction in the amount of data transfer to a mobile device. Filtering conditions to be used in the filtering need to be preset by a user. If a user does not preset the filtering conditions, then the user is either provided with no information at all or provided with all the information available. This is not desirable for the user. The technology disclosed in Patent Literature 1 is thus unable to provide a user with multimedia information that is practical to the user.

An object of the present invention is to provide an audience of broadcasting content with information that is more practical to the audience.

Solution to Problem

A content playback device of the present invention is a content playback device for playing back a broadcast content, including: receiving means for receiving additional information which is added to and transmitted along with the broadcast content; processing means for processing the additional information so that an external device can obtain information that is specific to unique information which the content playback device has; and additional information transmitting means for transmitting processed additional information to the external device.

With the content playback device, it is possible to provide, to a user via an external device, additional information which has been processed according to unique information of the content playback device. In general, a content playback device contains information (unique information) that specifically shows a status and settings of the content playback device. As the content playback device is used over a period of time, the unique information becomes updated so as to be more specific to an environment of and a pattern of device usage. Hence, the content playback device provides a user with additional information that has been processed according to the unique information. This makes it possible to provide a user with information which is specific to an environment of and a pattern of device usage and which is therefore practical to the user.

Note that "processing of extended additional information so that an external device can obtain information specific to unique information" means to cause additional information to contain (i) information specific to the unique information or (ii) key words etc. for obtaining the information specific to the unique information. Examples of the processing encompass (a) including, in additional information, information specific to unique information, (b) deleting, from additional information, any information other than information specific to unique information, (c) including, in additional information, key words for obtaining information, which is specific to unique information, from an external source (for example, the Internet), and (d) including, in additional information, key words for obtaining information, which is specific to unique information, from an application (for example, a route searching application). In any case above, an external device will end up obtaining information that is specific to unique information.

A television receiver of the present invention includes the content playback device.

With the television receiver, it is possible to bring about advantageous effects similar to those brought about by the content playback device.

An information providing system of the present invention includes: a first device; and a second device, the first device including receiving means for receiving additional information which is added to and transmitted along with a broadcast content, processing means for processing the additional information so that the second device can obtain information that is specific to unique information which the first device has, and additional information transmitting means for transmitting processed additional information to the second device, and the second device including additional information receiving means for receiving the additional information from the first device.

With the use of the first and second devices included in the information providing system, it is possible to bring about advantageous effects similar to those brought about by the content playback device.

A method of the present invention for providing information is a method for providing, to an external device, additional information which is added to a broadcast content and is transmitted along with the broadcast content to a content playback device, said method including the steps of: receiving the additional information; processing the additional information so that the external device can obtain information that is specific to unique information which the content playback device has; and transmitting processed additional information to the external device.

By carrying out each of the steps involved in the method, it is possible to bring about advantageous effects similar to those brought about by the content playback device.

An information providing program of the present invention is a program for (i) causing a computer to serve as the content playback devices and (ii) causing the computer to serve as each means included in the content playback device.

By a computer executing the information providing program, it is possible to bring about advantageous effects similar to those brought about by the content playback device.

A storage medium of the present invention is a computer-readable storage medium in which the information providing program is stored.

By a computer executing the information providing program stored in the storage medium, it is possible to bring about advantageous effects similar to those brought about by the content playback device.

Advantageous Effects of Invention

With (i) a content playback device, (ii) a television receiver, (iii) an information providing system, (iv) a method for providing information, (v) an information providing program, and (vi) a storage medium of the present invention, it is possible to provide a viewer of a broadcast content with information that is more practical to the viewer.

BRIEF DESCRIPTION OF DRAWINGS

FIG. 7 illustrates an example of extended additional information in accordance with Embodiment 1.

FIG. 9 illustrates an example of extended additional information in accordance with Embodiment 2.

FIG. 10 illustrates an example in which a mobile device in accordance with Embodiment 2 displays a result of its operation.

FIG. 11 illustrates an example of extended additional information in accordance with Embodiment 3.

FIG. 14 illustrates an example of extended additional information in accordance with Embodiment 4.

FIG. 20 illustrates an example of unique information in accordance with Example (1) of Embodiment 5.

FIG. 21 illustrates an example of extended additional information collected in a collecting section in accordance with Example (1) of Embodiment 5.

FIG. 22 illustrates an example of unique information in accordance with Example (2) of Embodiment 5.

FIG. 23 illustrates an example of extended additional information collected in a collecting section in accordance with Example (2) of Embodiment 5.

FIG. 24 illustrates an example of extended additional information collected in a collecting section in accordance with Example (3) of Embodiment 5.

FIG. 25 illustrates an example of unique information in accordance with Example (4) of Embodiment 5.

FIG. 26 illustrates an example of extended additional information in accordance with Example (4) of Embodiment 5.

FIG. 27 illustrates an example of unique information in accordance with Embodiment 6.

FIG. 28 illustrates an example of extended additional information collected in a collecting section in accordance with Embodiment 6.

DESCRIPTION OF EMBODIMENTS

The following description will discuss Embodiments of the present invention with reference to drawings.

Embodiment 1

Figure 1:
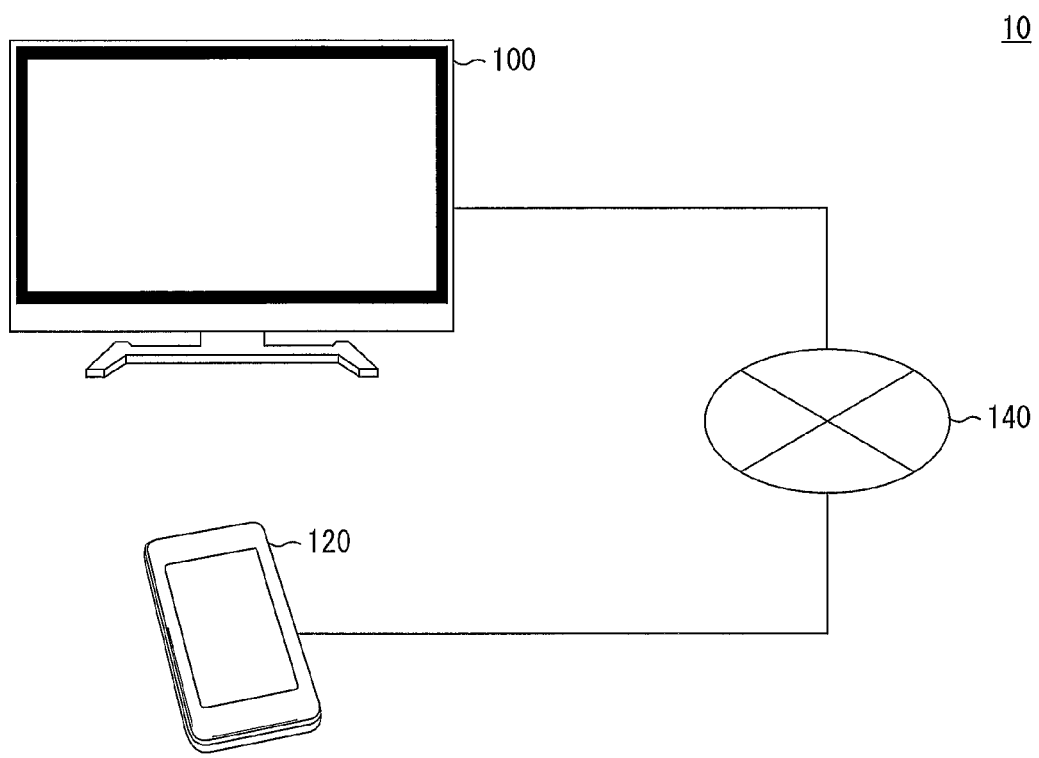
FIG. 1 is a view illustrating a system configuration of an information providing system in accordance with Embodiment 1.

Embodiment 1 of the present invention will be described first. FIG. 1 is a view illustrating a system configuration of an information providing system 10 in accordance with Embodiment 1. The information providing system 10 illustrated in FIG. 1 includes a television 100 and a mobile device 120.

The television 100 and the mobile device 120 are both owned by the same user. The television 100 is situated at the user's home, and the mobile device 120 is carried around by the user, for example. This allows the user to view television programs on the television 100 while using the mobile device 120.

The television 100 and the mobile device 120 are each connected, via wireless or wired communication means, to a network 140 such as the Internet and home networks. This allows the television 100 and the mobile device 120 to obtain information from the Internet or the like.

Wireless communication can be established between the television 100 and the mobile device 120. This allows the mobile device 120 and the television 100 to exchange data with each other. Examples of the wireless communication to be employed encompass Wi-Fi (Wireless Fidelity), Bluetooth (registered trademark), and infrared communications.

(Television 100)

The television 100 is an example of a content playback device for playing back broadcast content. Embodiment 1 employs, as a content playback device, a so-called television receiver that is capable of receiving television programs via various tuners and then playing a television program. Examples of the television 100 to be employed encompass liquid crystal display television, plasma television, organic EL television, and cathode ray tube television.

Additional information is added to (superimposed on) each of television programs received by the television 100. In other words, the television 100 receives additional information along with television programs. Examples of the additional information encompass information for use in data broadcasting.

The additional information contains (i) additional information for the television 100 (hereinafter referred to as "basic additional information") and (ii) additional information for the mobile device 120 (hereinafter referred to as "extended additional information"). For example, upon reception of additional information, the television 100 (a) carried out its own operation such as displaying images with the use of basic additional information contained in the additional information and (b) transmits, to the mobile device 120, extended additional information contained in the additional information.

Basic additional information is of a widely used type, and can therefore be decrypted by a device equipped with a standard browser. On the other hand, extended additional information is of a type that is newly defined and therefore not as widely used. This allows only a device, which is equipped with a browser whose functionality has been extended, to decrypt the extended additional information. Note that the television 100 and the mobile device 120 each have a browser whose functionality is extended, and can therefore decrypt extended additional information.

(Mobile Device 120)

The mobile device 120 is an example of external devices, and is a device capable of executing a variety of application programs (hereinafter referred to as "application"). The mobile device 120 is capable of (i) receiving extended additional information from the television 100 via wireless communication so as to display the extended additional information and (ii) executing an application, which is specific to the extended additional information thus received, so as to carry out its operation such as display, audio output, printing, and/or communication.

The mobile device 120 can thus provide a user with information concerning a television program played on the television 100. Specifically, the user can simultaneously (i) view the television program on the television 100 and (ii) obtain, on the mobile device 120, information concerning the television program. Examples of the mobile device 120 to be employed encompass mobile phone, PDA (mobile information device), smartphone, e-book reader, and tablet PC.

(Functional Configuration of Television 100)

Figure 2:
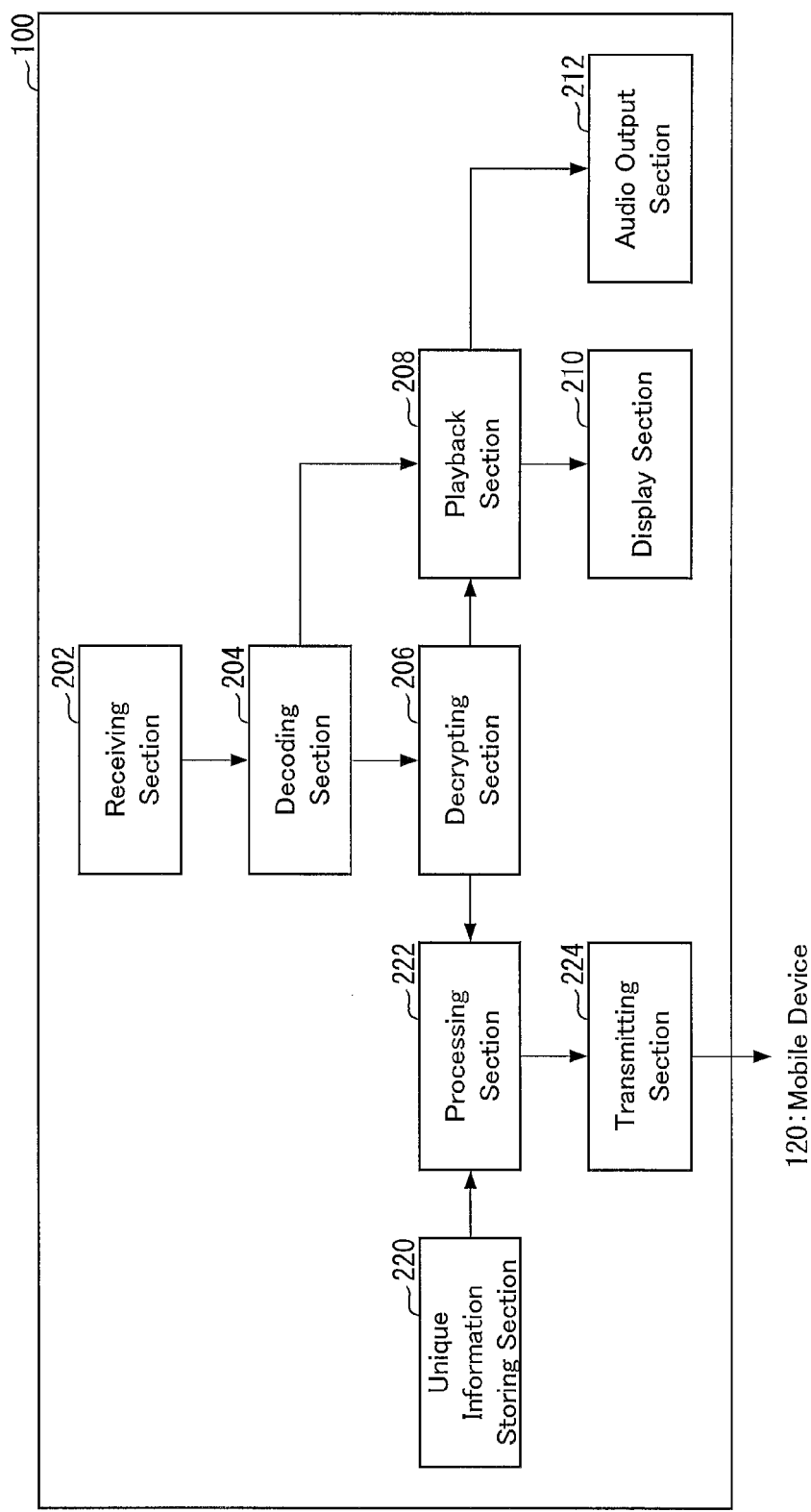
FIG. 2 is a block diagram illustrating functional configurations of a television in accordance with Embodiment 1.

Functional configuration of the television 100 will be described below. FIG. 2 is a block diagram illustrating the functional configuration of the television 100 in accordance with Embodiment 1. As illustrated in FIG. 2, the television 100 includes a receiving section 202, a decoding section 204, a decrypting section 206, a playback section 208, a display section 210, an audio output section 212, a unique information storing section 220, a processing section 222, and a transmitting section 224.

(Receiving Section 202)

The receiving section 202 receives a television program along with additional information. Specifically, the receiving section 202 receives broadcast waves transmitted from a broadcast station. For example, the receiving section 202 receives broadcast waves of digital terrestrial broadcasting via a digital terrestrial broadcasting tuner. In addition, the television 100 receives broadcast waves of satellite broadcasting via a satellite broadcasting tuner.

Broadcast waves are prepared by encrypting a television program to which additional information is added. That is, the receiving section 202 receives a television program and additional information simultaneously by receiving broadcast waves.

There are various methods by which the receiving section 202 receives a television program. Examples of methods that can be employed encompass (i) a method in which a television program is received via an external antenna and (ii) a method in which a television program is received via an internal antenna. Note, however, that the receiving section 202 does not necessarily need to receive a television program via an antenna, but can do so without using an antenna as are the cases of cable television broadcasting and Internet broadcasting.

(Decoding Section 204)

The decoding section 204 decodes the broadcast waves received by the receiving section 202. This allows the television program and the additional information to be obtained from broadcast waves.

(Decrypting Section 206)

The decrypting section 206 decrypts the additional information. The basic additional information and the extended additional information are contained in the additional information so as to be at least distinguishable. By decrypting the additional information received by the receiving section 202, the decrypting section 206 individually extracts the basic additional information and the extended additional information from the additional information.

(Playback Section 208)

The playback section 208 plays back a television program received by the receiving section 202. This (i) causes the display section 210 to display images which are specific to the television program thus played back and (ii) causes the audio output section 212 to output sounds which are specific to the television program thus played back.

The playback section 208 can also output the basic additional information obtained by the decrypting section 206. For example, in a case where the basic additional information contains information to be displayed, the playback section 208 can cause the display section 210 to display such information. Additionally, in a case where the basic additional information contains information to be outputted as a sound, the playback section 208 can cause the audio output section 212 to output such information.

The playback section 208 can further output the basic additional information in addition to the television program. For example, the playback section 208 can control the display section 210 to display an image, obtained from the television program, on which an image obtained from the basic additional information is superimposed. In addition, the playback section 208 can control the audio output section 212 to output a sound, obtained from the television program, with which a sound obtained from the basic additional information is mixed.

(Unique Information Storing Section 220)

The unique information storing section 220 stores therein unique information concerning the television 100. The unique information is contained in a storage medium, such as a memory, of the television 100. The unique information shows unique status and settings of the television 100.

(Processing Section 222)

The processing section 222 processes extended additional information, which has been received by the receiving section 202, so that the mobile device 120 obtains information specific to the unique information stored in the unique information storing section 220. The extended additional information is of a universal type for multiple users. Therefore, the extended additional information may contain unnecessary information for a user of the television 100 or lack necessary information for the user of the television 100.

In view of the circumstances, the processing section 222 thus processes the extended additional information so that the user of the television 100 can obtain information, which is specific to the unique information stored in the unique information storing section 220 and is therefore necessary for the user.

Note that "processing of extended additional information so that an external device can obtain information specific to unique information" means to cause additional information to contain (i) information specific to the unique information or (ii) key words etc. for obtaining the information specific to the unique information. Examples of the processing encompass (a) including, in additional information, information specific to unique information, (b) deleting, from additional information, any information other than information specific to unique information, (c) including, in additional information, key words for obtaining information, which is specific to unique information, from an external source (for example, the Internet), and (d) including, in additional information, key words for obtaining information, which is specific to unique information, from an application (for example, a route searching application). In any case above, an external device will end up obtaining information that is specific to unique information.

In Embodiment 1, in particular, information on a location of the television 100 is employed as an example of the unique information. The processing section 222 processes extended additional information so that a user can obtain information specific to the location of the television 100.

The information specific to the location of the television 100 is information which is more beneficial than general information to the user who is present at the location of the television 100. Examples of the information encompass (i) information on a route from the location of the television 100 to a site featured in a television program and (ii) information on a site close to the location of the television 100 among different sites relevant to information presented in a television program.

(Transmitting Section 224)

The transmitting section 224 transmits, to the mobile device 120, extended additional information that has been processed by the processing section 222. Specifically, the transmitting section 224 transmits processed extended additional information to the mobile device 120 via wireless communication between the television 100 and the mobile device 120.

Note that a method of transmitting processed extended additional information to the mobile device 120 is not limited to a method employing wireless communication, but can be, for example, (i) a method employing wired communication or (ii) a method employing a storage medium such as a memory card.

(Functional Configurations of Mobile Device 120)

Figure 3:
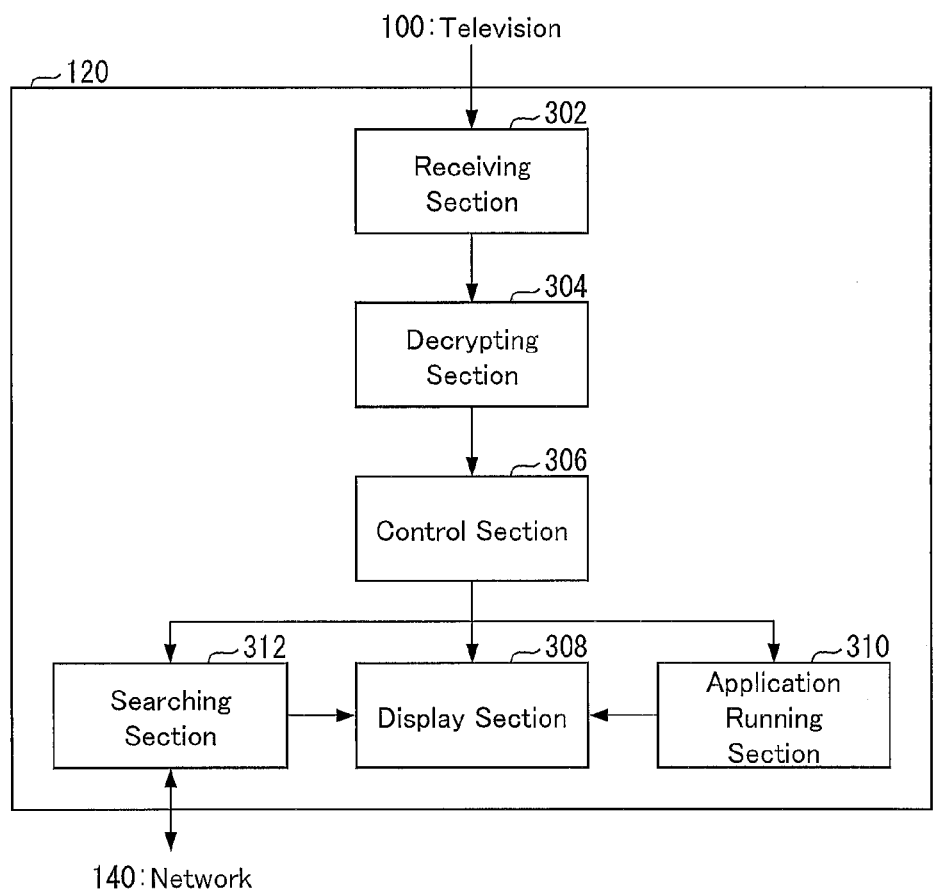
FIG. 3 is a block diagram illustrating functional configurations of a mobile device in accordance with Embodiment 1.

Functional configurations of the mobile device 120 will be described below. FIG. 3 is a block diagram illustrating functional configurations of the mobile device 120 in accordance with Embodiment 1. As illustrated in FIG. 3, the mobile device 120 includes a receiving section 302, a decrypting section 304, a control section 306, a display section 308, an application running section 310, and a searching section 312.

(Receiving Section 302)

The receiving section 302 receives extended additional information transmitted from the television 100.

(Decrypting Section 304)

The decrypting section 304 decrypts the extended additional information received by the receiving section 302. Specifically, since the extended additional information indicates a task that is to be carried out by the mobile device 120, the decrypting section 304 reads out the task from the extended additional information.

(Control Section 306)

The control section 306 controls, based on results decrypted by the decrypting section 304, operations carried out by respective sections in the mobile device 120. In Embodiment 1, the "sections" refers to the display section 308, the application running section 310, and the searching section 312.

For example, in a case where a result decrypted by the decrypting section 304 indicates a command to display certain information, the control section 306 controls the display section 308 to display such information.

In a case where a result decrypted by the decrypting section 304 indicates a command to run a certain application, the control section 306 controls the application running section 310 to run the application. After the application running section 310 has run the application, the control section 306 controls the display section 308 to display a result of running the application.

In a case where the result decrypted by the decrypting section 304 indicates a command to carry out a search, the control section 306 controls the searching section 312 to carry out a search. After the searching section 312 carries out the search, the control section 306 controls the display section 308 to display a result of the search. Note that the "search" herein refers to, for example, a search on the Internet, that is, an operation to be carried out in a case where information on any given extended additional information is to be obtained from the Internet.

(Steps in Operation of Television 100)

Figure 4:
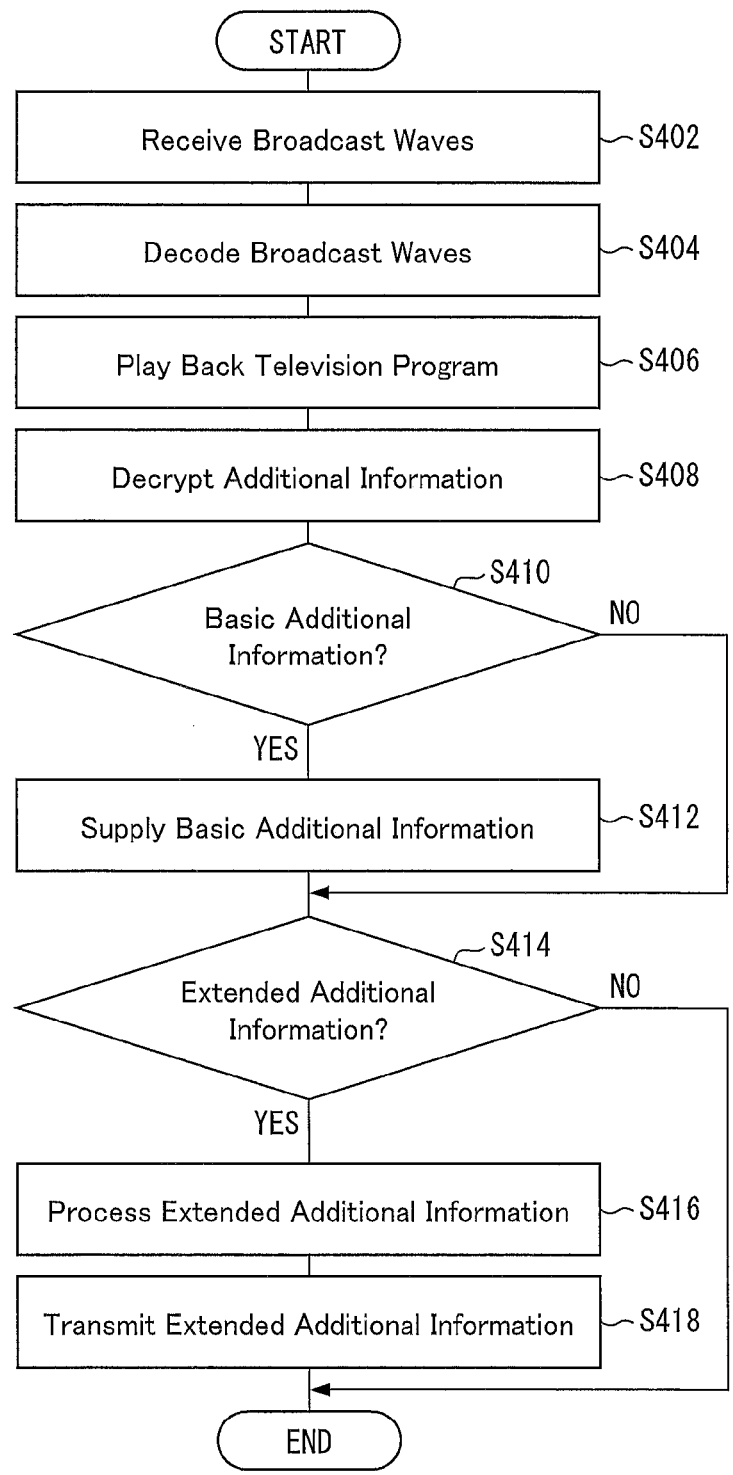
FIG. 4 is a flow chart illustrating steps involved in an operation of the television in accordance with Embodiment 1.

Steps involved in an operation of the television 100 will be described below. FIG. 4 is a flow chart illustrating the steps involved in the operation of the television 100 in accordance with Embodiment 1.

First, the receiving section 202 receives broadcast waves (Step S402).

Next, the decoding section 204 decodes the broadcast waves thus received in the step S402 (Step S404). This causes a television program and additional information to be obtained from the broadcast waves.

Subsequently, the playback section 208 plays back the television program thus obtained in the step S404 (Step S406).

Meanwhile, the decrypting section 206 decrypts the additional information obtained in the step S404 (Step S408). This causes basic additional information and extended additional information to be individually extracted from the additional information.

In a case where basic additional information is extracted in the step S408 (Yes in Step S410), the playback section 208 outputs, in addition to the television program played back in the step S406, the basic additional information extracted in the step S408 (Step S412). Then, the television 100 proceeds to Step S414. On the other hand, in a case where basic additional information is not extracted in the step S408 (No in Step S410), the television 100 proceeds to Step S414 instead of carrying out the step S412. Note that if, in the step S412, the television 100 is set so as not to output basic additional information, then the playback section 208 will not output any basic additional information.

In a case where extended additional information is extracted in the step S408 (Yes in Step S414), the processing section 222 processes the extended additional information so that the mobile device 120 can obtain processed extended additional information specific to unique information stored in the unique information storing section 220 (Step S416). Then, the transmitting section 224 transmits, to the mobile device 120, the processed extended additional information that has been processed in the step S416 (Step S418). Thereafter, the television 100 ends the operation. On the other hand, in a case where extended additional information is not extracted in the step S408 (No in Step S414), the television 100 ends the operation instead of carrying out the step S416 and S418.

By repeating the above operation, the television 100 can continuously (i) play back a television program 100 and (ii) transmit extended additional information.

(Steps in Operation of Mobile Device 120)

Figure 5:
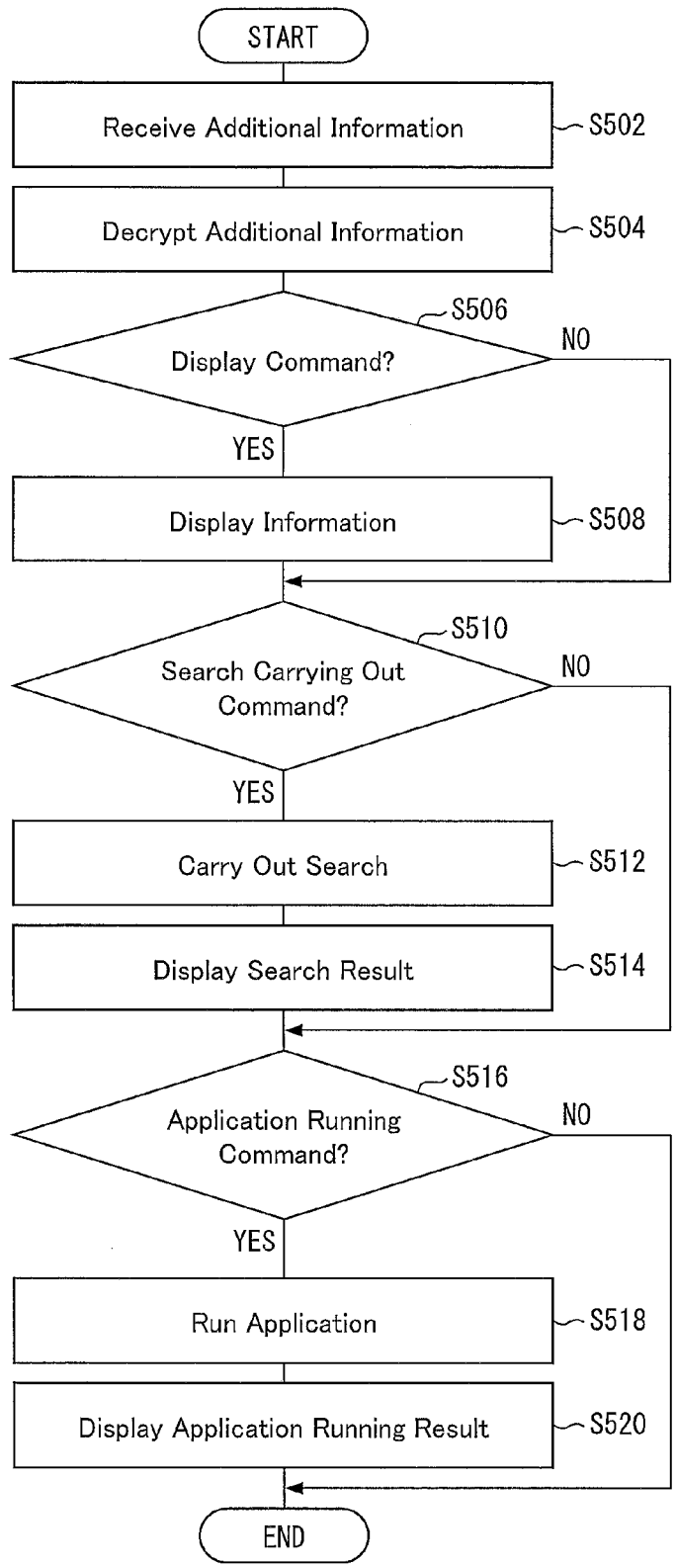
FIG. 5 is a flow chart illustrating steps involved in an operation of the mobile device in accordance with Embodiment 1.

Steps involved in an operation of the mobile device 120 will be described below. FIG. 5 is a flow chart illustrating how the mobile device 120 in accordance with Embodiment 1 proceeds with the steps.

First, the receiving section 302 receives extended additional information from the television 100 (Step S502). Next, the decrypting section 304 decrypts the extended additional information thus received in the step S502 (Step S504).

In a case where it is found in the step S504 that the extended additional information contains a command to display certain information (Yes in Step S506), the control section 306 controls the display section 308 to display such information (Step S508). Then, the mobile device 120 proceeds to Step S510. On the other hand, in a case where it is found in the step S504 that the extended additional information does not contain a command to display any information (No in Step S506), the mobile device 120 proceeds to Step S10 instead of carrying out the step S508.

In a case where the result decrypted in the step S504 indicates that the extended additional information contains a command to carry out a search (Yes in Step S510), the searching section 312 carries out a search (Step S512). Then, the searching section 312 causes the display section 308 to display search results (Step S514). Then, the mobile device 120 proceeds to Step S516. On the other hand, the result decrypted in the step S504 indicates that the extended additional information does not contain a command to carry out a search (No in Step S510), the mobile device 120 proceeds to Step S516 instead of carrying out the step S512 or S514.

In a case where it is found in the step S504 that the extended additional information contains a command to run a certain application (Yes in Step S516), the application running section 310 runs the application (Step S518). Then, the application running section 310 causes the display section 308 to display a result obtained by running the application (Step S520). Then, the mobile device 120 ends the operation.

On the other hand, in a case where it is found in the step S504 that the extended additional information does not contain a command to run a certain application (No in Step S516), the mobile device 120 ends the operation instead of carrying out the step S518 or S520.

Each time the mobile device 120 receives extended additional information from the television 100, the mobile device 120 thus carries out an operation in accordance with the extended additional information thus received. That is, the mobile device 120 carries out an operation in accordance with extended additional information that has been processed so as to be specific to unique information concerning the television 100. This allows the mobile device 120 to provide a user with extended additional information that is specific to the unique information concerning the television 100.

Note that, according to the flow chart, results of operations which the mobile device 120 has carried out are to be individually displayed. Alternatively, in a case where the mobile device 120 carries out a plurality of operations, it is possible for the mobile device 120 to display, all at once, results of operations which the mobile device 120 has carried out. In so doing, the mobile device 120 does not necessarily need to display the entire portion of such information within one page, but can display such information across a plurality of pages.

(Example of Operation of Processing Section 222)

An example of processing of extended additional information carried out by the processing section 222 will be described below in detail. As already described, the processing section 222 processes extended additional information based on unique information stored in the unique information storing section 220. Embodiment 1 describes an example in which the processing section 222 processes extended additional information based on information on a location (hereinafter referred to as location information) of the television 100.

(Example of Unique Information)

Figure 6:
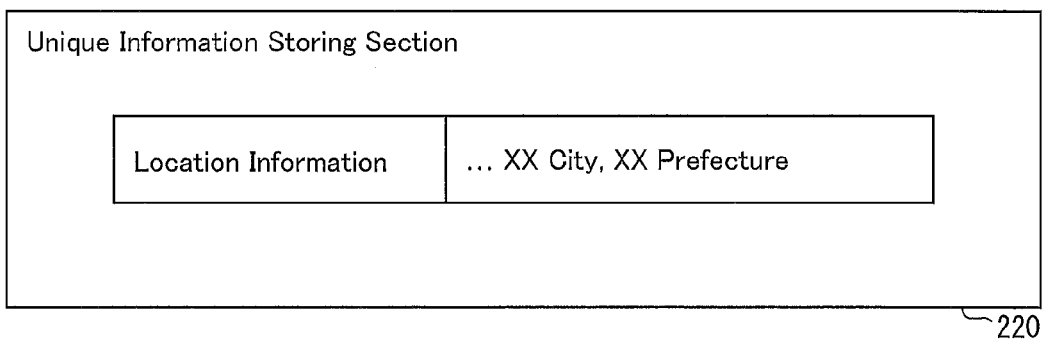
FIG. 6 illustrates an example of unique information in accordance with Embodiment 1.

FIG. 6 illustrates an example of unique information in accordance with Embodiment 1. Embodiment 1 describes, as an example of the unique information, information on the location of the television 100. The information on the location, for example, is entered by a user upon an initial setting of the television 100.

Although information on location is identified by a name of the location in the example illustrated in FIG. 6, the information on location can be alternatively identified by a postal code, coordinates, an area code, or the like. Note that it is not limited to a user that enters the information on location. For example, it is alternatively possible that the information on location is automatically obtained from, for example, a GPS (Global Positioning System). In short, the information on location is not limited to a specific one, provided that the information on location identifies the location of the television 100.

FIG. 7 illustrates an example of extended additional information in accordance with Embodiment 1. Specifically, FIG. 7 illustrates extended additional information which has not been processed by the processing section 222. (a) of FIG. 7 shows the extended additional information in tabular form. (b) of FIG. 7 shows the extended additional information in an XML (Extensible Markup Language) format so that the television 100 and the mobile device 120 can each decrypt the extended additional information.

The television 100 exchanges information with mobile device 120. For example, the television 100 transmits, to the mobile device 120, extended additional information in the XML format (such as the extended additional information illustrated in (b) of FIG. 7) with the use of functions such as "passXMLDocToPeripheral( )" and "getArrayFromPeripheral( )" which functions are standardized by incorporated association ARIB (Association of Radio Industries and Businesses).

(b) of FIG. 7 shows, of the entire extended additional information in the XML format, only an XML file that specifies what is to be displayed of the extended additional information. In practice, however, the extended additional information contains, in addition to the XML file, files such as an XSL (Extensible Stylesheet Language) file and a CSS (Cascading Style Sheets) file, both of which are to be used to specify a display style.

In the example illustrated in FIG. 7, the extended additional information contains, as information on a restaurant relevant to a television program being broadcast, (i) the name of the restaurant, (ii) the address of the restaurant, (iii) the telephone number of the restaurant, (iv) an image of the restaurant, and (v) notes on a restaurant. The notes include the URL (Uniform Resource Locator) of a reservation page to which the extended additional information is linked. Other examples of the information on the restaurant encompass business hours, regular holidays, the number of tables, and access information.

Note that the extended additional information is not limited to the one in the XML format, provided that the television 100 and the mobile device 120 can each decrypt the extended additional information. For example, the extended additional information can be defined by a BML (Broadcast Markup Language), which is an XML-based tag description language that (i) is standardized by the ARIB and (ii) is for use in data broadcasting.

(Example of Operation of Processing Section 222)

Based on the information on location (see FIG. 6) stored in the unique information storing section 220, the processing section 222 processes extended additional information so that the mobile device 120 can obtain information specific to the location of the television 100.

For example, the processing section 222 (i) adds, to the extended additional information illustrated in FIG. 7, the information on location illustrated in FIG. 6 which information serves as information on a current location for use in a route search and (ii) retains, as information on a destination for use in the route search, the information on the restaurant which has been contained in the extended additional information. This is how a current location and a destination for use in a route search are set in extended additional information.

The extended additional information, which has been thus processed by the processing section 222, is then transmitted to the mobile device 120 from the transmitting section 224.

(Example of Operation of Mobile Device 120)

Figure 8:
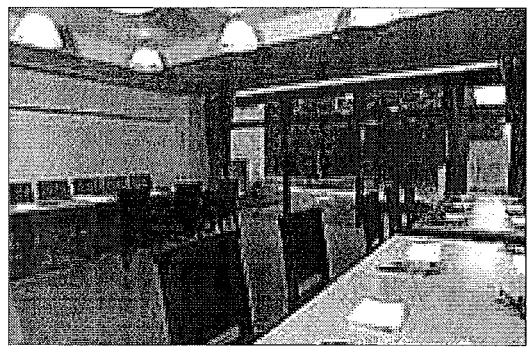
FIG. 8 illustrates an example in which the mobile device in accordance with Embodiment 1 displays a result of its operation.

FIG. 8 illustrates an example in which the mobile device 120 in accordance with Embodiment 1 displays a result of operation which the mobile device 120 has carried out. The mobile device 120, which has received extended additional information transmitted from the television 100, carries out an operation based on the extended additional information thus received.

In the example illustrated in FIG. 8, the mobile device 120 displays the extended additional information received from the television 100. Specifically, the mobile device 120 displays the information on the restaurant (see FIG. 7) which information is contained in the extended additional information thus received. This allows a user to obtain, from the mobile device 120, the information on the restaurant.

In the example illustrated in FIG. 8, a display of the mobile device 120 shows, as the information on the restaurant, (i) the name of the restaurant, (ii) the address of the restaurant, (iii) the telephone number of the restaurant, (iv) an image of the restaurant, and (v) notes on a restaurant.

The notes contain a link to the reservation page. In a case where the user selects the link, the mobile device 120 (i) obtains, via the Internet, the reservation page thus linked and then (ii) shows the reservation page on its display.

(Route Search)

Note that, in some cases, the mobile device 120 receives extended additional information in which information on a current location and information on a destination for use in a route search are contained. In such cases, the mobile device 120 can carry out a route search to find a route from the current location, which is specified by the information on the current location, to the destination, which is specified by the information on the destination.

The mobile device 120 has, for example, a route search application installed therein. In a case where the mobile device 120 receives the extended additional information, the mobile device 120 carries out a route search by running the route search application. Then, the mobile device 120 notifies, by visual display, a user of a result of the route search, that is, a route from the current location to the destination.

Assume that, for example, (i) the information on location of the television 100 ("XX City, XX Prefecture") illustrated in FIG. 6 is entered as a current location and (ii) the information on address of the restaurant ("1-3-2, YY, XX-ku, Tokyo") illustrated in FIG. 7 is entered as a destination. In this case, the mobile device 120 carries out a route search to find a route from the location of the television 100 to the address of the restaurant. Then, the mobile device 120 shows the route on its display.

When the mobile device 120 receives extended additional information, the mobile device 120 is thus capable of not only (i) displaying information on a site featured in a television program being viewed by a user but also (ii) automatically carrying out a route search to find a route to the site and then displaying the route to the site. This allows the user to view the route to the site relevant to the television program being broadcast on the mobile device 120 without any form of setting or operation.

Note that, in Embodiment 1, it is also possible for the television 100 to (i) include, in extended additional information, a command to obtain further information on a restaurant and the like via the Internet and (ii) send the command to the mobile device 120. In such a case, the mobile device 120 controls the searching section 312 to carry out an Internet search, obtains the further information, and then displays the further information.

Embodiment 2

The following description will discuss Embodiment 2 of the present invention. Embodiment 2 will describe another example of the operation carried out by the processing section 222. That is, Embodiment 2 is similar to Embodiment 1 except in operation of a processing section 222. Therefore, the rest of Embodiment 2 that is similar to Embodiment 1 will not be described below.

(Another Example of Operation of Processing Section 222)

FIG. 9 illustrates an example of extended additional information in accordance with Embodiment 2. (a) of FIG. 9 illustrates, in tabular form, extended additional information that has not been processed by the processing section 222. (b) of FIG. 9 illustrates, in tabular form, extended additional information that has been processed by the processing section 222. (c) of FIG. 9 illustrates, in an XML format, the extended additional information that has been processed by the processing section 222.

As illustrated in (a) of FIG. 9, for example, the extended additional information that has not been processed by the processing section 222 contains, as information on a motor vehicle relevant to a television program being broadcast, information concerning dealers from which the motor vehicle can be purchased. Based on (i) the information on location illustrated in FIG. 6 and (ii) information on locations of the dealers contained in the extended additional information, the processing section 222 calculates a distance between a location of a television 100 and the respective dealers. This allows the processing section 222 to determine, of all the dealers, a dealer(s) located nearby.

For example, the processing section 222 determines, as a dealer(s) located nearby, (i) a dealer located close to the location of the television 100 or (ii) dealers arranged in ascending order of distance from the location of the television 100. In this case, the processing section 222 can further narrow down the dealers to those which are located less than a predetermined distance away from the location of the television 100.

Then, the processing section 222 deletes, from the extended additional information, information concerning a dealer(s) that is/are not located nearby. This causes the extended additional information to only contain information concerning the dealer(s) located nearby, as illustrated in (b) and (c) of FIG. 9. Note that, in the examples illustrated in (b) and (c) of FIG. 9, the processing section 222 adds, to the extended additional information, the distance to the dealer(s) (each) located nearby.

(Another Example of Operation of Mobile Device 120)

FIG. 10 illustrates an example in which a mobile device 120 in accordance with Embodiment 2 displays a result of operation that the mobile device 120 has carried out. In the example, the mobile device 120 displays extended additional information received from the television 100. Specifically, the mobile device 120 displays the information concerning the dealer(s) nearby which information is contained in the extended additional information thus received by the mobile device 120. This allows a user to obtain the information concerning the dealer(s) located nearby.

In the example illustrated in FIG. 10, a display of the mobile device 120 shows, based on the extended additional information illustrated in (c) of FIG. 9, the information concerning the dealer(s) located nearby.

According to Embodiment 2, since the mobile device 120 receives such extended additional information as that concerning the dealer(s) nearby, the mobile device 120 can display information concerning nearby dealer(s) from which merchandise relevant to a television program being broadcast can be purchased. This allows a user to view the information on the mobile device 120 without any form of setting or operation.

Note that, in Embodiment 1, it is also possible for the television 100 to (i) include, in extended additional information, a command to obtain further information on a dealer(s) and the like via the Internet and (ii) send the command to the mobile device 120. In such a case, the mobile device 120 controls a searching section 312 to carry out an Internet search, obtains the further information, and then displays the further information.

Embodiment 3

The following description will discuss Embodiment 3 in accordance with the present invention. Embodiment 3 will describe a further example of the operation carried out by the processing section 222. That is, Embodiment 3 is similar to Embodiment 1 except in operation of a processing section 222. Therefore, the rest of Embodiment 3 that is similar to Embodiment 1 will not be described below.

(Example of Operation of Processing Section 222)

FIG. 11 illustrates an example of extended additional information in accordance with Embodiment 3. (a) of FIG. 11 illustrates extended additional information that has not been processed by the processing section 222. (b) of FIG. 11 illustrates extended additional information that has been processed by the processing section 222.

As illustrated in (a) of FIG. 11, the extended additional information, that has not been processed by the processing section 222, contains information on sites which are located on a driving route featured in a television program being broadcast. Specifically, the extended additional information contains respective names of the sites and information on respective locations of the sites. The processing section 222 (i) adds, to the extended additional information, information on location illustrated in FIG. 6 which information serves as information on a current location for use in a route search and (ii) retains the information on the sites which has been contained in the extended additional information. This is how the current location of the television 100 and sites located on the driving route (i.e. departure point, stop(s), destination point) are each set in extended additional information (see (b) of FIG. 11).

(Example of Operation of Mobile Device 120)

Figures 12, 13:
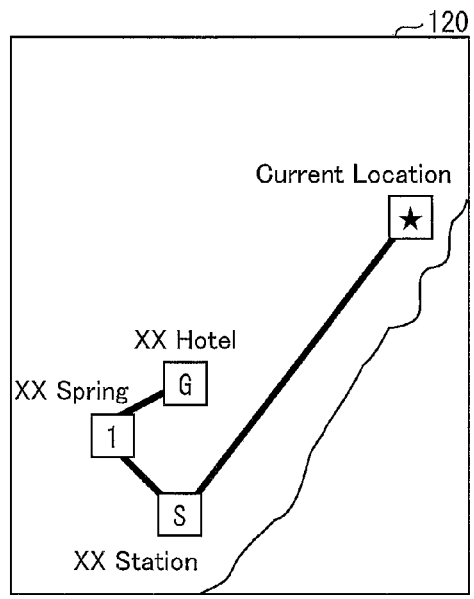
FIG. 12 illustrates an example in which a mobile device in accordance with Embodiment 3 displays a result of its operation.
FIG. 13 illustrates an example of unique information stored in a unique information storing section in accordance with Embodiment 4.

FIG. 12 illustrates an example in which a mobile device 120 in accordance with Embodiment 3 displays a result of operation which the mobile device 120 has carried out. In the example illustrated in FIG. 12, the mobile device 120 carries out a route search based on extended additional information received from the television 100. Specifically, the extended additional information received by the mobile device 120 contains information on the current location of the television 100 and the sites located on the driving route (i.e. departure point, stop(s), destination point) (see (b) of FIG. 11). Based on the information, the mobile device 120 (i) carries out a route search to find a route from the current location to each of the sites and then (ii) displays the result of the route search.

In the example illustrated in (b) of FIG. 11, "XX City, XX Prefecture" is set as the current location of the television 100 in the extended additional information. "XX Station" is set as the name of the departure point of the driving route. "XX Spring" is set as the name of the stop on the driving route. "Hotel XX" is set as the name of the destination point of the driving route.

The mobile device 120, which has received the extended additional information, carries out a route search to find a route to the destination point "Hotel XX" from the current location of the television 100 via the departure point "XX Station" and the stop "XX Spring." Then, as illustrated in FIG. 12, the mobile device 120 displays the route thus found through the route search.

According to Embodiment 3, when the mobile device 120 receives extended additional information, the mobile device 120 thus (i) automatically carries out a route search to find a driving route featured in a television program and then (ii) displays a result of the route search. This allows a user of the mobile device 120 to view the driving route on the mobile device 120 without any form of setting or operation. In addition, the mobile device 120 carries out, as a navigation device, route navigation according to the driving route thus found. This allows a user of the mobile device 120 to easily arrive at each of the stops and destination points.

Note that, in Embodiment 3, it is also possible for the television 100 to (i) include, in extended additional information, a command to obtain further information on the driving route, the sites, and the like via the Internet and (ii) send the command to the mobile device 120. In such a case, the mobile device 120 controls a searching section 312 to carry out an Internet search, obtains the further information, and then displays the further information.

Embodiment 4

The following description will discuss Embodiment 4 of the present invention. Embodiments 1 through 3 each discussed an example in which (i) location information of the television 100 is used as unique information and (ii) extended additional information is processed based on the location information. Embodiment 4 will describe an example in which (a) information on a preference of a user with respect to a television 100 is used as unique information and (b) extended additional information is processed based on the information of such a preference of the user. The rest (points other than points described below) of Embodiment 4 is similar to Embodiment 1, and therefore will not be described below.

(Processing Section 222)

According to Embodiment 4, a processing section 222 processes extended additional information, based on information indicative of a preference (hereinafter referred to as "preference information") of a user with respect to the television 100, the preference information being used as unique information. Note that "the processing of extended additional information based on preference information" herein means processing of extended additional information for the purpose of providing beneficial information to a user having a preference with regard to any given object. An example of such processing is to extract, from information concerning items which are relevant to a television program being broadcast, information on an item(s) that matches the user's preference.

(Preference Information)

FIG. 13 illustrates an example of unique information in accordance with Embodiment 4. According to Embodiment 4, preference information, which indicates a preference of a user with respect to the television 100, is used as an example of the unique information. In the example illustrated in FIG. 13, the user's favorite television programs are shown as the preference information.

The preference information is obtained based on an analysis, made by the television 100, of a television program viewing history of the user. In other words, the preference information is not prepared on the user's end, but is automatically prepared by the television 100.

For example, the user's television program viewing history on the television 100 is collected in a storage medium, owned by the television 100, such as a memory. The television program viewing history contains information such as names, genres, viewing dates, viewing hours of television programs viewed. The television 100 analyzes the television program viewing history so as to determine a television program that is viewed more than others. Then, the television 100 sets, in the preference information, the more-viewed television program as a favorite television program. The preference information can include information on a plurality of television programs.

In such a case, the plurality of television programs can be assigned respective degrees of preference.

For example, the preference information can be configured so that television programs, which are viewed a greater number of times than others, are assigned higher degrees of preference (i.e. are prioritized over the others). For example, a television program, which has been viewed three times, will be assigned a higher degree of preference than (i.e. is prioritized over) a television program which has been viewed two times.

Alternatively, it is also possible to configure the preference information so that television programs, which are viewed at time intervals longer than others, are assigned higher degrees of preference (i.e. are prioritized over the others). For example, a television program, which has been viewed at time intervals of one week, will be assigned a higher degree of preference than (i.e. is prioritized over) a television program which has been viewed at time intervals of two weeks.

Alternatively, it is also possible to configure the preference information so that television programs, which are viewed more recently than others, are assigned higher degrees of preference (i.e. are prioritized over the others). For example, a television program, which was viewed two weeks earlier, would be assigned a higher degree of preference than (i.e. is prioritized over) a television program which was viewed three weeks earlier.

Note that the preference information can be segmented depending on the days of the week and the hours of the day. In other words, different television programs can be designated as respective favorite television programs, depending on the day of the week and on the hour of the day.

Note also that, although a user's favorite television program(s) is set in the preference information in the examples above, it is also possible to set a user's favorite genre(s) in the preference information. In such a case, a television program(s), which belongs to a user's favorite genre(s) designated in the preference information, becomes the user's favorite television program(s).

(Example of Operation of Processing Section 222)

FIG. 14 illustrates an example of extended additional information in accordance with Embodiment 4. (a) of FIG. 14 illustrates extended additional information that has not been processed by the processing section 222. (b) of FIG. 14 illustrates extended additional information that has been processed by the processing section 222.

The processing section 222 processes, based on preference information (see FIG. 13) stored in the unique information storing section 220, extended additional information so that a mobile device 120 can obtain information specific to a user's preference.

For example, as illustrated in (a) of FIG. 14, the extended additional information that has not been processed by the processing section 222 shows information concerning items relevant to a television program which is being broadcast (such information is hereinafter referred to as "item information"). Based on the preference information illustrated in FIG. 13, the processing section 222 determines, of all the items shown, an item(s) that matches the user's preference.

For example, in a case where item information contains a key word(s) that is identical or similar to a key word(s) contained in the preference information, the processing section 222 determines the item information as item information concerning an item(s) that matches a user's preference. In this case, the key word(s) contained in the preference information can be (i) a key word(s) preregistered in the preference information or (ii) a key word(s) extracted from texts contained in the preference information. Furthermore, the key word(s)

contained in the item information can be (a) a key word(s) preregistered in the item information or (b) a key word(s) extracted from texts contained in the item information.

For example, the item information illustrated in (a) of FIG. 14 shows names of places where the respective items were produced. In the example illustrated in FIG. 14, the names of the places where the respective items were produced are designated as key words.

The processing section 222 deletes, from the extended additional information, information concerning an item(s) that does not match a user's preference. This allows the extended additional information to contain only information on an item(s) that matches the user's preference (see (b) of FIG. 14).

For example, the extended additional information illustrated in (a) of FIG. 14 contains information concerning three items ("Item 1", "Item 2", and "Item 3"). Based on the preference information indicative of a user's preference, the processing section 222 identifies "Item 1" as an item that matches the user's preference.

This is because the preference information of FIG. 13, which shows "Korean Drama," and the item information of FIG. 14, which shows "Korea" as a place where "Item 1" is produced, are both relevant to Korea.

Then, the processing section 222 deletes, from the extended additional information, item information concerning all the items except for "Item 1." This causes the extended additional information to contain only the item information concerning "Item 1" (see (b) of FIG. 14).

In a case where, in the processing above, there are a plurality of pieces of preference information which are sorted out in order of priority, it is possible for the processing section 222 to choose one that is a first priority. For example, in a case where, among a plurality of pieces of item information, there is no item information that matches a piece of preference information that is a first priority, it is possible for the processing section 222 to extract, from the plurality of item information, a piece of item information that matches a piece of preference information that is a second priority.

In a case where, in the processing above, pieces of preference information are linked with respective days of the week and respective hours of the day, it is possible for the processing section 222 to choose a piece of preference information corresponding to the current date and time. In such a case, the processing section 222 need only determine the current date and time according to (i) the system date of the television 100, (ii) the current date and time indicated by broadcast waves, or the like.

(Example of Operation of Mobile Device 120)

Figure 15:
FIG. 15 illustrates an example in which the mobile device in accordance with Embodiment 4 displays a result of its operation.

FIG. 15 illustrates an example in which the mobile device 120 displays a result of operation which the mobile device 120 has carried out. In the example, the mobile device 120 displays extended additional information received from the television 100. Specifically, the mobile device 120 displays item information concerning an item(s) that matches a user's preference, which item information is contained in the extended additional information thus received by the mobile device 120. This allows the user to obtain item information that matches his/her own preference.

In the example illustrated in FIG. 15, a display of the mobile device 120 shows, based on the extended additional information illustrated in (b) of FIG. 14, item information concerning "Item 1." The item information contains a link (URL) allowing access to a webpage where the item can be purchased. The user accesses the webpage by selecting the link through manipulation of the mobile device 120. Then, the user can obtain further information on the item or make a purchase of the item.

According to Embodiment 4, (i) the television 100 thus automatically prepares preference information, based on a user's television program viewing history and (ii) the mobile device 120 displays item information concerning an item(s) that matches the user's preference. This allows the user to view, on the mobile device 120 without any type of setting or operation, information on an item which has been selected from items featured in a television program viewed by the user.

Note that, in Embodiment 4, it is also possible for the television 100 to (i) include, in extended additional information, a command to obtain further information on the item(s) and the like via the Internet and (ii) send the command to the mobile device 120. In such a case, the mobile device 120 controls a searching section 312 to carry out an Internet search, obtains the further information, and then displays the further information.

Embodiment 5

The following description will discuss Embodiment 5 of the present invention. Embodiment 5 will describe an example in which extended additional information is collected so as to be transmitted to a mobile device 120 at certain timing. Part of Embodiment 5 which is not described below is identical to Embodiment 1, and therefore will be omitted.

(Functional Configurations of Television 100)

Figure 16:
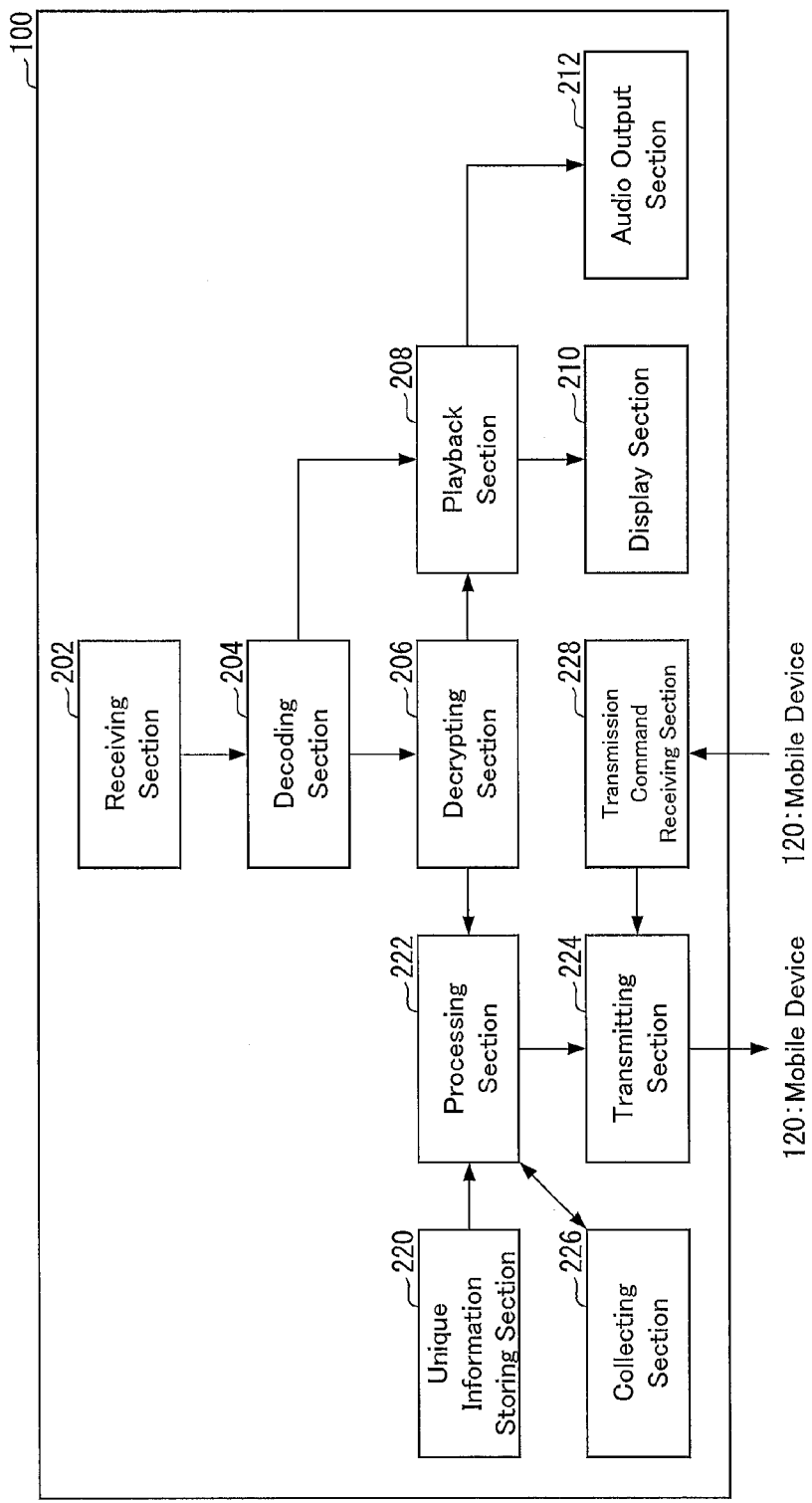
FIG. 16 is a block diagram illustrating functional configurations of a television in accordance with Embodiment 5.
Figure 17:
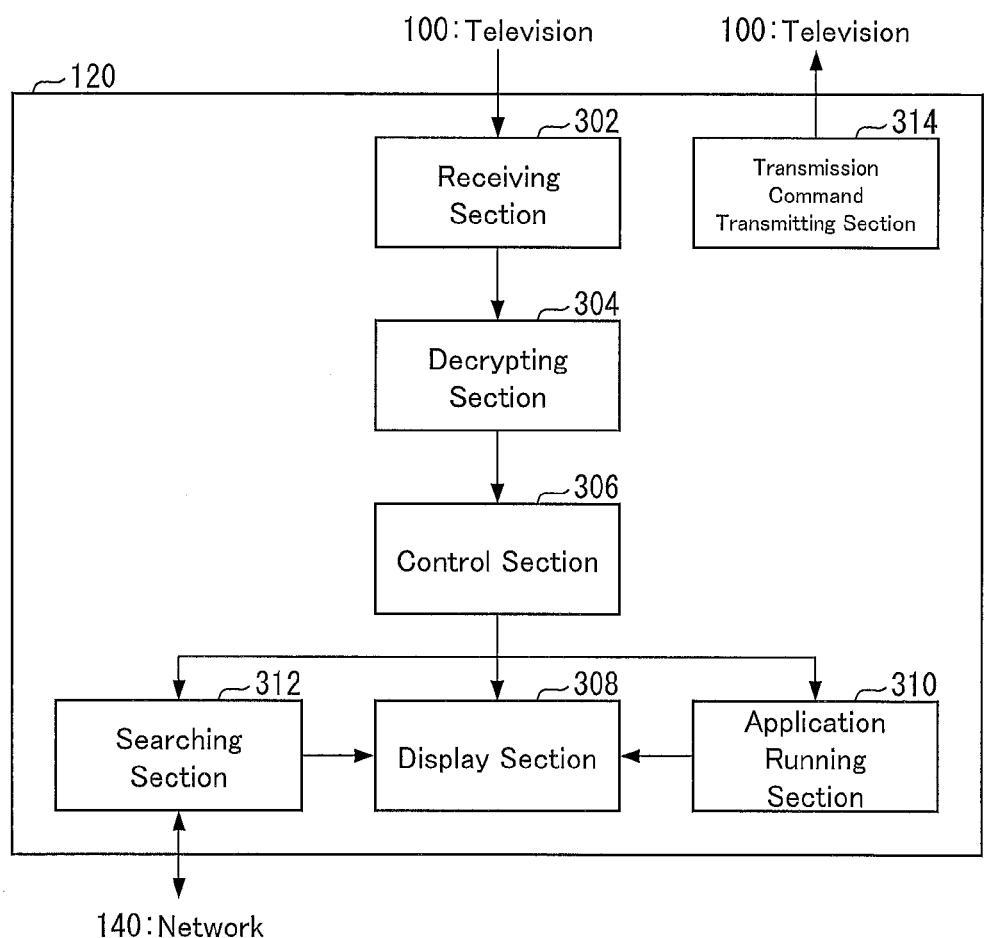
FIG. 17 is a block diagram illustrating functional configurations of a mobile device in accordance with Embodiment 5.

First, functional configurations of a television 100 will be described. FIG. 16 is a block diagram illustrating the functional configurations of the television 100 in accordance with Embodiment 5. FIG. 17 is a block diagram illustrating functional configurations of the mobile device 120 in accordance with Embodiment 5.

In addition to the configuration of Embodiment 1 (see FIG. 2), the television 100 is configured to include a collecting section 226 and a transmission command receiving section 228 (see FIG. 16). The collecting section 226 collects extended additional information received by the receiving section 202. The transmission command receiving section 228 receives a transmission command which has been transmitted from the mobile device 120. A transmission command is to request a transmission of extended additional information.

On the other hand, in addition to the configuration of Embodiment 1 (see FIG. 3), the mobile device 120 is configured to include a transmission command transmitting section 314. The transmission command transmitting section 314 transmits a transmission command to the television 100. For example, the transmission command transmitting section 314 transmits a transmission command upon a certain operation of a user on the mobile device 120.

(Steps in Operation of Television 100)

Figure 18:
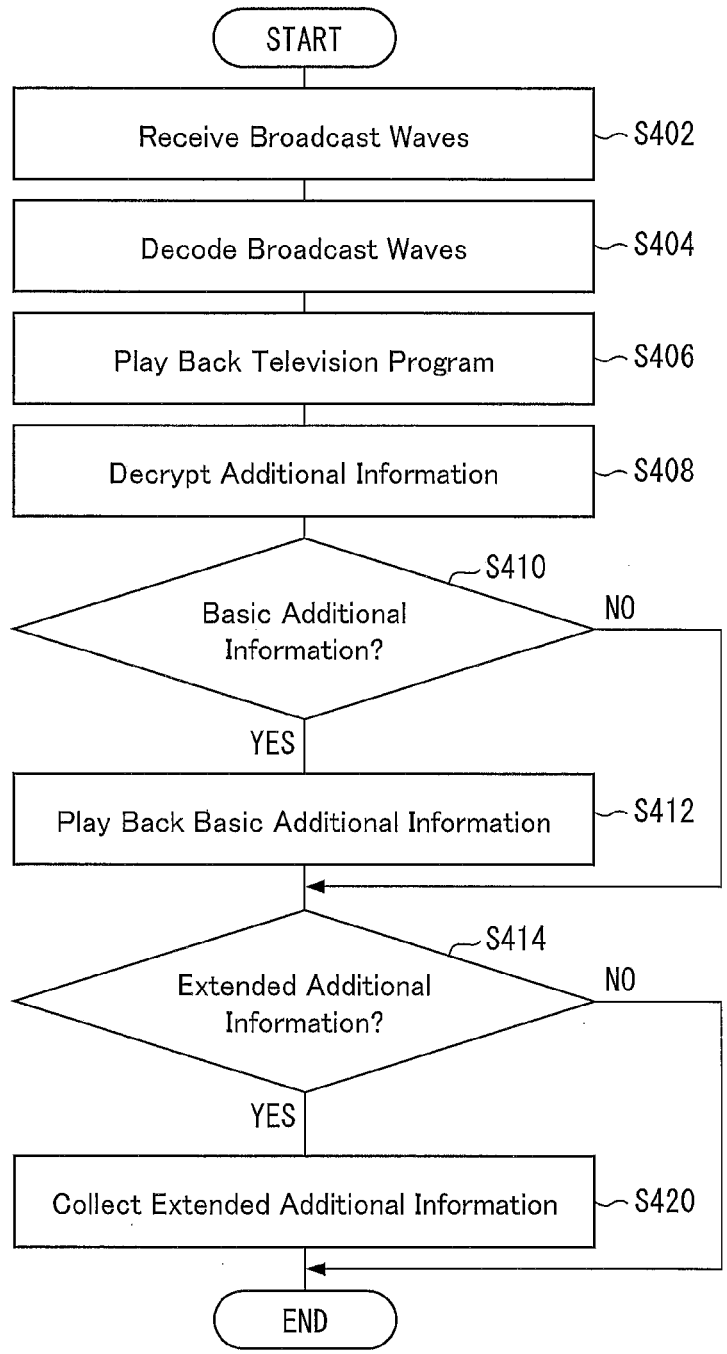
FIG. 18 is a flow chart illustrating steps involved in an operation of the television in accordance with Embodiment 5.
Figure 19:
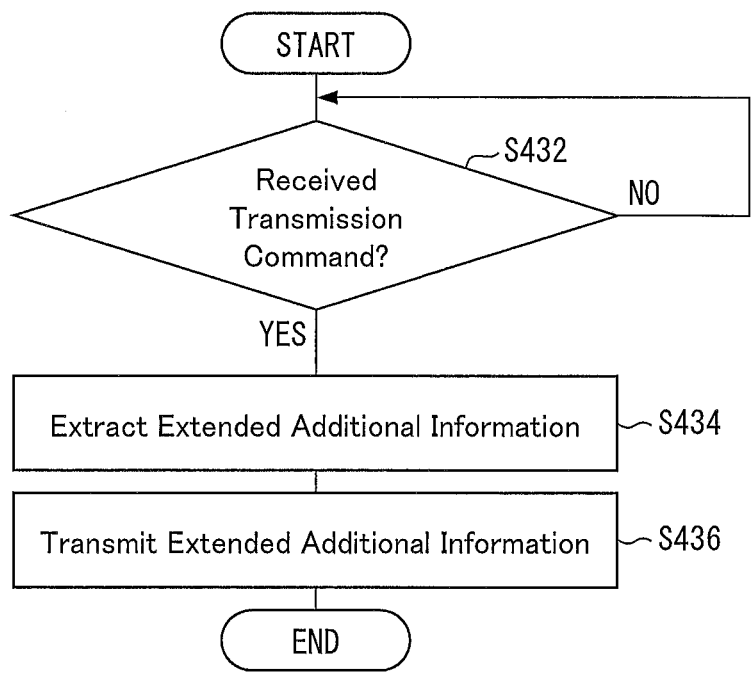
FIG. 19 is a flow chart illustrating other steps involved in an operation of the television in accordance with Embodiment 5.

The following description will discuss how the television 100 proceeds with steps involved in operation of the television 100. FIGS. 18 and 19 are each a flow chart illustrating how the television 100 in accordance with Embodiment 5 proceeds with the steps. FIG. 18 illustrates how to proceed with the steps up to a step of collection of extended additional information.

According to the steps illustrated in FIG. 18, in a case where extended additional information is obtained (Yes in Step S414) by decryption in Step S408, the collecting section 226 collects the extended additional information (Step S420). The rest of the operation is identical to the operation described in Embodiment 1.

On the other hand, FIG. 19 illustrates how the extended additional information is transmitted. The transmission command receiving section 228 is ready to receive a transmission command from the mobile device 120.

In a case where the transmission command transmitting section 314 of the mobile device 120 transmits a transmission command, the transmission command receiving section 228 receives the transmission command (Yes in Step S432). Then, a processing section 222 extracts, from the extended additional information collected in the collecting section 226, extended additional information that meets predetermined extraction conditions (Step S434). Then, the transmitting section 224 transmits, to the mobile device 120, extended additional information that has been processed by the processing section 222 (Step S436). Then, the television 100 ends the operation.

On the other hand, in a case where the transmission command receiving section 228 does not receive a transmission command (No in Step S432), the transmission command receiving section 228 remains on standby until it receives a transmission command.

(Examples of Operation of Processing Section 222)

The following description will specifically discuss examples of how the processing section 222 of Embodiment 5 processes extended additional information. The processing section 222 processes extended additional information to be transmitted to the mobile device 120 so that the mobile device 120 can obtain extended additional information collected in the collecting section 226. In especial, first extended additional information is included, by the processing section 222, in second extended additional information which is transmitted to the mobile device 120 based on unique information stored in the unique information storing section 220. The first extended additional information is extended additional information which (i) is collected in the collecting section 226 and (ii) meets predetermined extraction conditions.

(Examples of Extraction Conditions)

There are no particular limitations on the unique information and the extraction conditions, provided that they are used for extraction of information which is more useful to a user. The following examples (1) through (4) each show an example of such unique information and extraction conditions.

Example (1)

In Example (1), preference information indicative of a user's preference is used as unique information. A processing section 222 extracts, from extended additional information collected in a collecting section 226, information that matches the user's preference.

FIG. 20 illustrates an example of the unique information in accordance with Example (1) of Embodiment 5. FIG. 21 illustrates an example of extended additional information collected in the collecting section 226 in accordance with Example (1) of Embodiment 5. In the example illustrated in FIG. 20, what is set as preference information is, for example, television program information concerning television programs frequently viewed by a user. The television program information shows individuals who appear on the television programs. The processing section 222 determines, based on the television program information, the user's favorite individuals. Then, the processing section 222 extracts, from pieces of extended additional information collected in the collecting section 226, extended additional information relevant to the user's favorite individuals.

For example, in the example illustrated in FIG. 20, since "Person A" appears on the plurality of television programs the user views, "Person A" is determined as the user's favorite individual. Then, the processing section 222 extracts, from the extended additional information illustrated in FIG. 21, extended additional information relevant to "Person A." In this case, the extended additional information relevant to "Person A" is television program information 2 and 3, each of which concerns a television program on which "Person A" appears.

The mobile device 120, which has received the television program information 2 and 3, can (i) display the television program information 2 and 3 and/or (ii) collect, as the television program information 2 and 3 in a storage medium such as a memory.

Note that, in Example (1), it is also possible for the television 100 to (i) include, in extended additional information, a command to obtain further information on a user's favorite individual and the like via the Internet and (ii) send the command to the mobile device 120. In such a case, the mobile device 120 controls a searching section 312 to carry out an Internet search, obtains the further information, and then displays the further information.

Example (2)

In Example (2), what is set as unique information is (i) preference information indicative of a user's preference and (ii) a title of a television program which is being broadcast (information for specifying the content of the television program being broadcast). A processing section 222 extracts, from extended additional information collected in a collecting section 226, information concerning a television program that (a) matches the user's preference and (b) has a title identical to that of the television program which is being broadcast.

FIG. 22 illustrates an example of unique information in accordance with Example (2) of Embodiment 5. FIG. 23 illustrates an example of extended additional information collected in the collecting section 226 in accordance with Example (2) of Embodiment 5. In the example illustrated in FIG. 22, what is set as unique information is, for example, (i) television program information (preference information) on "Korean Drama A" which is a user's favorite television program and (ii) "Korean Drama A: Episode 4" (title of a television program which is being broadcast).

In a case where the user's favorite television program is being broadcast, the processing section 222 extracts, from a plurality of pieces of extended additional information collected in the collecting section 226, information on a television program having the same title as that of the user's favorite television program. Examples of such a television program encompass different episodes of the same television program (having the same title) which episodes were already broadcast or are yet to be broadcast.

For example, in the example illustrated in FIG. 22, the unique information indicates that "Korean Drama A" is set in preference information and "Korean Drama A: Episode 4" is set as the title of the television program which is being broadcast. This implies that the television 100 is broadcasting "Korean Drama A" which is the user's favorite television program.

In this case, the processing section 222 extracts, from the extended additional information illustrated in FIG. 23, television program information 1 through 3 having the same title "Korean Drama A." It follows that, if (i) "Korean Drama A" is not set in preference information and/or (ii) the television program "Korean Drama A" is not being broadcast, then the television program information 1 through 3 will not be extracted. In other words, it is only when a user's favorite television program is being broadcast that extended additional information on the same television program (for example, program information on or cast information on episodes 1 through 3 etc.) will be extracted.

Note that, in Example (2), it is also possible for the television 100 to (i) include, in extended additional information, a command to obtain, via the Internet, further information on (a) an episode of a television program which episode is being broadcast, (b) different episodes of the same television program, and the like and (ii) send the command to the mobile device 120 (see FIG. 23). In such a case, the mobile device 120 controls a searching section 312 to carry out an Internet search, obtains the further information, and then displays the further information.

Example (3)

FIG. 24 illustrates an example of extended additional information collected in a collecting section 226 in accordance with Example (3) of Embodiment 5. In Example (2), a processing section 222 can extract information that (i) matches a user's preference and (ii) concerns a television program belonging to a genre identical to that to which a television program that is being broadcast belongs.

For example, the unique information illustrated in FIG. 22 indicates that (i) "Korean Drama A" which is being broadcast is a television program that is frequently viewed by the user and (ii) "Korean Drama A" belongs to a genre "Korean Drama."

In this case, the processing section 222 can extract, from extended additional information illustrated in FIG. 24, television program information B that belongs to the same genre "Korean Drama."

Note that, in Example (3), it is also possible for the television 100 to (i) include, in extended additional information, a command to obtain, via the Internet, further information on (a) a television program being broadcast, (b) a television program that belongs to a genre identical to that of the television program being broadcast, and the like and (ii) send the command to the mobile device 120. In such a case, the mobile device 120 controls a searching section 312 to carry out an Internet search, obtains the further information, and then displays the further information.

Example (4)

In Example (4), what is set as unique information is (i) preference information indicative of a user's preference, (ii) a title of a television program which is being broadcast (information for specifying the content of the television program which is being broadcast), and (iii) current date and time. A processing section 222 extracts, from extended additional information collected in a collecting section 226, information on participating in a prize competition (hereinafter referred to as "prize competition information") which information meets extraction conditions that (a) "it is information concerning the same television program which is being broadcast" and (b) "it is information which has not expired as of the current date and time thus set."

FIG. 25 illustrates an example of unique information in accordance with Example (4) of Embodiment 5. FIG. 26 illustrates an example of extended additional information collected in the collecting section 226 in accordance with Example (4) of Embodiment 5.

In the example illustrated in FIG. 25, what is set as preference information is, for example, "Korean Drama A" which is a title of a television program that a user frequently views. What is set as unique information is "Korean Drama A: Episode 4" that is a title of a television program which is being broadcast.

In a case where a television program frequently viewed by a user is being broadcast, the processing section 222 extracts, from a plurality of pieces of extended additional information collected in the collecting section 226, information on the same television program. Examples of the same television program encompass different episodes of the same television program (having the same title) which episodes were already broadcast or are yet to be broadcast.

For example, in regard to the unique information illustrated in FIG. 25, "Korean Drama A" is set as preference information and "Korean Drama A: Episode 4" is set as the title of the television program being broadcast. This implies that the television 100 is broadcasting "Korean Drama A" which is the user's favorite television program.

In this case, the processing section 222 designates, as candidates to be extracted from the extended additional information illustrated in FIG. 26, prize competition information 1 through 3 having the same title "Korean Drama A." Then, the processing section 222 extracts, from the candidates, prize competition information that has not expired as of the current date and time.

In the unique information illustrated in FIG. 25, "2011-01-01, 14:00" is set as the current date and time. Note that, in the extended additional information illustrated in FIG. 26, the periods of validity of the respective prize competition information 1 through 3 are set to expire on "2010-11-30," "2011-1-15," and "2011-1-31," respectively.

In view of the circumstances, the processing section 222 extracts, from the prize competition information 1 through 3, unexpired prize competition information 2 and 3 as prize competition information. Therefore, a user of a mobile device 120 is provided with the unexpired prize competition information 2 and 3 together. Since the user of the mobile device 120 thus obtains a plurality of pieces of prize competition information together, the user can enter a plurality of prize competitions all at once.

Note that, in Example (4), it is also possible for the television 100 to (i) include, in extended additional information, a command to obtain further information on a prize competition and the like via the Internet and (ii) send the command to the mobile device 120. In such a case, the mobile device 120 controls a searching section 312 to carry out an Internet search, obtains the further information, and then displays the further information.

Embodiment 6

The following description will discuss Embodiment 6 of the present invention. Embodiment 6 will describe an example in which a destination of extended additional information is limited to an external device 120 owned by a user who is viewing a particular scene of a television program. Part of Embodiment 6 which is not described below is identical to Embodiment 5, and therefore will be omitted. FIG. 27 illustrates an example of unique information in accordance with Embodiment 6. FIG. 28 illustrates an example of extended additional information collected in a collecting section 226 in accordance with Embodiment 6.

(Unique Information)

According to Embodiment 6, what is set as unique information stored in a unique information storing section 220 is viewing scene determining information for determining whether or not a user is viewing a particular scene of a television program. For example, in the example illustrated in FIG. 27, the unique information storing section 220 stores, as viewing scene determining information, (i) current date and time and (ii) a title of a television program which is being broadcast.

(Exclusive Information)

Note that what is set as the extended additional information collected in the collecting section 226 is exclusive information which is associated with (i) a title of a television program and (ii) transmitting time at which the exclusive information is to be transmitted (see FIG. 28). The exclusive information is information that is transmitted only to a user who is viewing a particular scene of a television program. An example of the particular scene is a present give-away time. Examples of the exclusive information encompass (i) a URL (Uniform Resource Locator) allowing access to a webpage where an entry for a prize competition can be made and (ii) a standby image to be displayed on a mobile phone.

(Example of Operation of Processing Section 222)

When determining that a user is viewing a particular scene of a television program, the processing section 222 extracts, from the extended additional information collected in the collecting section 226, exclusive information associated with the particular scene. Then, the processing section 222 includes, in extended additional information (to be transmitted to the mobile device 120), the exclusive information thus extracted. Then, the transmitting section 224 transmits the extended additional information to the mobile device 120.

The processing section 222 can determine that a user is viewing a particular scene of a television program, in a case where, for example, (i) a match has been confirmed between (a) a title of a television program shown in the viewing scene determining information and (b) a title of a television program shown in the extended additional information and (ii) it has been confirmed that the current date and time shown in the viewing scene determining information has reached broadcasting time shown in the extended additional information.

In the example illustrated in FIG. 28, exclusive information 1 is set so that (i) a title of a television program is "Drive GO!" and (ii) broadcasting time is "14:25." In a case where the broadcasting time thus set has come while the television program is being viewed, the processing section 222 (a) includes the exclusive information 1 in extended additional information and then (b) controls the transmitting section 224 to transmit the extended additional information. Note that, in a case where another television program is being viewed when the broadcasting time has come, the processing section 222 does not include the exclusive information 1 in the extended additional information.

The television 100 thus transmits exclusive information to the mobile device 120 in a case where the television 100 determines that a user is viewing a particular scene of a television program. It follows that the television 100 will never transmit the exclusive information to the mobile device 120 in a case where the user is not viewing the particular scene.

According to the example illustrated in FIG. 28, (i) exclusive information concerning a particular scene of a television program is collected in advance and then (ii) the exclusive information is transmitted at timing when a user views the particular scene.

Timing of transmission of exclusive information is not limited to such timing. Alternatively, instead of collecting exclusive information, if a user is viewing a particular scene at timing when exclusive information on a particular scene is received from broadcast waves, then such exclusive information can be transmitted.

In such a case, since the exclusive information is transmitted immediately after being received, the exclusive information does not need to contain information, such as the time when the exclusive information is transmitted, for specifying the timing when the exclusive information is transmitted.

(Period of Validity)

The processing section 222 can process extended additional information so that exclusive information, which has already been transmitted, becomes invalid when a period of validity of the exclusive information has been expired.

For example, the processing section 222 can include, in extended additional information, not only exclusive information but also information indicative of a period of validity of the exclusive information.

Alternatively, it is also possible that, in a case where a period of validity is expired after exclusive information is transmitted to the mobile device 120, the television 100 further transmits, to the mobile device 120, extended additional information containing a command that the exclusive information be made invalid.

In any case above, the mobile device 120 invalidates extended additional information when the period of validity has been expired. "Invalidating of extended additional information" means to (i) prevent the extended additional information from being displayed, (ii) invalidate a link contained in the extended additional information if the link is contained at all, and the like.

Note that examples of the period of validity encompass (i) a time period until a time point when broadcasting of a particular scene of a television program ends and (ii) a predetermined length of time after exclusive information was transmitted.

Note also that a particular scene of a television program is not limited to a scene that appears in a television program, but can be other television programs each relevant to the television program, such as a commercial. For example, the television 100 can be configured so as (i) to transmit exclusive information to the mobile device 120 in a case where a user is viewing a particular commercial and (ii) not to transmit exclusive information to the mobile device 120 in a case where the user is not viewing the particular commercial.

According to the above example, the television 100 is configured to transmit exclusive information when the current date and time reaches broadcasting time of a television program. Note, however, that the television 100 can be configured to transmit exclusive information to the mobile device 120 in a case where a user views a particular scene of a television program for a predetermined length of time or longer. This allows the television 100 to transmit exclusive information to a user who is actually a viewer of the particular scene.

According to Embodiment 6, the television 100 thus provides a user, who is viewing a particular scene of a television program, with exclusive information that is exclusive to the viewer. A user, who is viewing a particular scene, has an interest in what is involved in the particular scene. As such, to prove a user with exclusive information means to provide intended information to an intended user.

Note that, in Embodiment 6, it is also possible for the television 100 to (i) include, in extended additional information, a command to obtain further information on a particular scene of a television program and the like via the Internet and then (ii) send the command to the mobile device 120. In such a case, the mobile device 120 controls a searching section 312 to carry out an Internet search, obtains the further information, and then displays the further information.

(Program and Storage Medium)

Functions of content playback devices (televisions 100) and external devices (mobile devices 120) described in Embodiments 1 through 6 can be (i) realized by means of hardware by use of logic circuits provided on an integrated circuit (IC chip) or (ii) realized by means of software by use of a CPU (Central Processing Unit).

For example, the content playback devices and the external devices can each be configured by including (i) a CPU for executing a command of a program for achieving a function, (ii) a ROM (Read Only Memory) for storing the program, (iii) a RAM (Random Access Memory) for extracting the program, (iv) a storage device (storage medium) such as a memory for storing the program and various data, and the like.

In such a case, the object of the present invention can be attained by (i) providing a storage medium in a content playback device, the storage medium having stored (in a computer-readable manner) program codes (executable program, intermediate code program, and source program) of a control program which is a piece of software for achieving the function of the content playback device and (ii) causing a computer (or CPU or MPU) to read out and then execute the program codes thus stored in the storage medium.

Examples of the storage medium encompass (i) tapes such as a magnetic tape and a cassette tape, (ii) disks including magnetic disks such as a floppy disk (Registered Trademark) and hard disk and optical disks such as a CD-ROM, an MO, an MD, a DVD, and a BD, (iii) cards such as an IC card (including a memory card) and an optical card, (iv) semiconductor memories such as a mask ROM, an EPROM, an EEPROM, and a flash ROM, and (v) logic circuits such as a PLD (Programmable logic device) and an FPGA (Field Programmable Gate Array).

Furthermore, the content playback device can be provided with the program code via a communications network. The communications network is not limited to any particular one, provided that the program code can be transmitted via the communications network. Examples of the communications network encompass the Internet, an intranet, an extranet, a LAN, an ISDN, a VAN, a CATV communications network, a virtual dedicated network (virtual private network), a telephone line network, a mobile communications network, and a satellite communications network. A transfer medium for configuring the communications network need only be a medium via which the program code can be transmitted, and is not limited to any particular configuration or any type. Examples of the transfer medium encompass (i) wired lines such as IEEE 1394, a USB, an electric power line, a cable TV line, a telephone line, and an ADSL (Asymmetric Digital Subscriber Line) and (ii) wireless communications such as an infrared radiation (e.g. IrDA and remote control), Bluetooth (Registered Trademark), IEEE 802.11 wireless, HDR (High Data Rate), NFC (Near Field Communication), a mobile telephone network, a satellite line, and a terrestrial digital network.

(Modifications)

Embodiments, which have been discussed in the detailed description, are illustrative only in every way and therefore should not be construed as limitative. The scope of the present invention is defined by the claims set forth below, and is meant to encompass any variations that fall within the scope of the claims and within the scope and meaning of equivalents. The following description will discuss Modifications of Embodiments.

(Content Playback Device)

Although Embodiments each have discussed an example in which a television is employed as a content playback device, the content playback device is not limited to such a television. Examples of the content playback device encompass any devices such as a broadcasting tuner, a personal computer, a mobile device, a mobile phone, any storage device, and an automobile navigation device, provided that the content playback device is at least capable of (i) receiving a content which is being broadcast and (ii) communicating with an external device.

Although Embodiments each have discussed an example in which a mobile device is employed as an external device, the external device is not limited to such a mobile device. Examples of the external device encompass any devices such as a personal computer, a mobile phone, and a remote controller of a content playback device, provided that the external device is capable of communicating with a content playback device.

(Route Search)

According to Embodiments 1 and 3, (i) the television 100 transmits, to the mobile device 120, information for use in a route search and (ii) the mobile device 120 carries out the route search. Note, however, that the preset invention is not limited to such an example. For example, it is possible that the television 100 carries out a route search, transmits a result of the route search to the mobile device 120, and controls the mobile device 120 to display the result. Alternatively, it is possible that the mobile device 120 (a) controls another external device (such as an application server on the Internet) to carry out a route search by forwarding, to the another external device, information for use in the route search, (b) receives a result of the route search from the another external device, and (c) displays the result. In short, any device can carry out a route search, provided that the mobile device 120 can display a result of the route search.

(Timing of Transmission)

According to Embodiment 5, extended additional information, which is collected in the collecting section 226, is transmitted by the television 100 to the mobile device 120 at timing that is determined by a user. Alternatively, extended additional information can be transmitted at different timings.

For example, the television 100 can be configured to transmit extended additional information to the mobile device 120 at regular time intervals. Alternatively, in a case where extended additional information received from broadcast waves indicates timing of transmission, the television 100 can transmit the extended additional information to the mobile device 120 at such timing.

(Transmission of Extended Additional Information Collected)

According to Embodiment 5, (i) extended additional information is collected in the collecting section 226 and (ii) part of the extended additional information, which part is specific to unique information, is, at certain timing, extracted from the collecting section and then transmitted. Provided that pieces of extended additional information specific to unique information can be transmitted all together by the television 100 to the mobile device 120, such transmission can be realized with the use of any configuration. For example, it is possible to configure the television 100 so that pieces of extended additional information specific to unique information are (i) extracted from extended additional information received from broadcast waves, (ii) collected in the collecting section 226, and (iii) transmitted to the mobile device 120 at certain timing.

(System Configuration)

What carries out each of the functions which have been described in Embodiments is not limited to those described in Embodiments. In fact, what carries out each of the functions can be any device, provided that functions similar to the functions described in Embodiments can be achieved in the information providing system as a whole. For example, the mobile device 120 or other devices can have part of the functions which the television 100 has in Embodiments. Furthermore, the television 100 or other device can have part of the functions which the mobile device 120 has in Embodiments.

(Summary)

As described above, a content playback device of the present embodiment is a content playback device for playing back a broadcast content, including: receiving means for receiving additional information which is added to and transmitted along with the broadcast content; processing means for processing the additional information so that an external device can obtain information that is specific to unique information which the content playback device has; and additional information transmitting means for transmitting processed additional information to the external device.

With the content playback device, it is possible to provide, to a user via an external device, additional information which has been processed according to unique information of the content playback device. In general, a content playback device contains information (unique information) that specifically shows a status and settings of the content playback device. As the content playback device is used over a period of time, the unique information becomes updated so as to be more specific to an environment of and a pattern of device usage. Hence, the content playback device of the present embodiment provides a user with additional information that has been processed according to the unique information. This makes it possible to provide a user with information which is specific to an environment of and a pattern of device usage and which is therefore practical to the user.

Note that "processing of extended additional information so that an external device can obtain information specific to unique information" means to cause additional information to contain (i) information specific to the unique information or (ii) key words etc. for obtaining the information specific to the unique information. Examples of the processing encompass (a) including, in additional information, information specific to unique information, (b) deleting, from additional information, any information other than information specific to unique information, (c) including, in additional information, key words for obtaining information, which is specific to unique information, from an external source (for example, the Internet), and (d) including, in additional information, key words for obtaining information, which is specific to unique information, from an application (for example, a route searching application). In any case above, an external device will end up obtaining information that is specific to unique information.

It is preferable to configure the content playback device such that: the unique information contains location information concerning a location of the content playback device; and the processing means processes the additional information so that the external device can obtain information which is specific to the location of the content playback device.

With the configuration, it is possible to provide a user with such practical information as information which is specific to the location of the content playback device (i.e. the location of the user viewing the broadcast content).

It is preferable to configure the content playback device such that: the additional information contains site information concerning a site relevant to the broadcast content; and the processing means processes the additional information so that the external device can obtain route information concerning a route from the location of the content playback device to the site.

With the configuration, it is possible to provide a user with such practical information as a route from the location of the content playback device (i.e. the location of the user viewing the broadcast content) to a site relevant to the broadcast content.

It is preferable to configure the content playback device such that: the additional information contains a plurality of pieces of site information concerning a plurality of sites each relevant to the broadcast content; and the processing means processes the additional information so that the external device can obtain, of all the plurality of pieces of site information, a piece of site information concerning a site located close to the location of the content playback device.

With the configuration, it is possible to provide a user with such practical information as information concerning a site close to the location of the content playback device (i.e. the location of the user viewing the broadcast content). Note that "information concerning a site close to the location of the content playback device" means, for example, (i) information concerning a site that is, among a plurality of sites, closest to the location of the content playback device or (ii) information concerning a site(s) located within a predetermined distance from the location of the content playback device.

It is preferable to configure the content playback device such that: the unique information contains preference information which (i) is obtained by analyzing a broadcast content viewing history and (ii) is indicative of a preference of a user of the content playback device; and the processing means processes the additional information so that the external device can obtain information specific to the preference of the user.

With the configuration, it is possible to provide a user, who is viewing the broadcast content, with such practical information as information specific to a preference of the user.

It is preferable to configure the content playback device such that: the additional information contains a plurality of pieces of item information concerning a plurality of items each relevant to the broadcast content; and the processing means processes the additional information so that the external device can obtain, of all the plurality of pieces of item information, a piece of item information concerning an item that matches the preference of the user.

With the configuration, it is possible to provide a user, who is viewing the broadcast content, with such practical information as information concerning an item that matches the preference of the user.

It is preferable that the content playback device further includes: a collecting section for collecting the additional information, the processing means processing additional information collected in the collecting section so that the external device can obtain, of the additional information collected in the collecting section, a piece of additional information specific to the unique information stored in the content playback device.

With the configuration, it is possible to provide a user with a plurality of pieces of information all at once, which are each practical to the user.

It is preferable to configure the content playback device such that: the unique information contains information for determining a title of a broadcast content which is being played back; and in a case where a broadcast content is being played back, the processing means processes the additional information collected in the collecting section so that the external device can obtain, of the additional information collected in the collecting section, a piece of additional information concerning a broadcast content that has a title identical to a title of the broadcast content which is being played back.

With the configuration, it is possible to provide a user with a plurality of pieces of practical information all at once, such as information concerning broadcast contents each having a title identical to a title of a broadcast content being viewed by the user.

It is preferable to configure the content playback device such that: the unique information contains information for determining a genre of a broadcast content which is being played back; and in a case where a broadcast content is being played back, the processing means processes the additional information collected in the collecting section so that the external device can obtain, of the additional information collected in the collecting section, a piece of additional information concerning a broadcast content that belongs to a genre identical to a genre of the broadcast content which is being played back.

With the configuration, it is possible to provide a user with a plurality of pieces of practical information all at once, such as information concerning broadcast contents each belonging to a genre identical to a genre of a broadcast content being viewed by the user.

It is preferable to configure the content playback device such that: the unique information contains information indicative of current date and time; and the processing means processes the additional information collected in the collecting section so that the external device can obtain, of the additional information collected in the collecting section, a piece of additional information whose period of validity has not expired as of the current date and time.

With the configuration, it is possible to provide a user with such practical information as information that has not expired.

It is preferable to configure the content playback device such that: the unique information contains information for determining a scene of a broadcast content which is being played back; and only in a case where a certain scene of the broadcast content is being played back, the processing means processes the additional information so that the external device can obtain exclusive information associated with the certain scene.

With the configuration, it is possible to provide a user with such practical information as information exclusive to the user viewing a particular scene of a broadcast content.

A television receiver of the present embodiment includes any one of the content playback devices.

With the television receiver, it is possible to bring about advantageous effects similar to those brought about by the content playback device.

An information providing system of the present embodiment includes: a first device; and a second device, the first device including receiving means for receiving additional information which is added to and transmitted along with a broadcast content, processing means for processing the additional information so that the second device can obtain information that is specific to unique information which the first device has, and additional information transmitting means for transmitting processed additional information to the second device, and the second device including additional information receiving means for receiving the additional information from the first device.

With the use of the first and second devices included in the information providing system, it is possible to bring about advantageous effects similar to those brought about by the content playback device.

A method of the present embodiment for providing information is a method for providing, to an external device, additional information which is added to a broadcast content and is transmitted along with the broadcast content to a content playback device, said method including the steps of: receiving the additional information; processing the additional information so that the external device can obtain information that is specific to unique information which the content playback device has; and transmitting processed additional information to the external device.

By carrying out each of the steps involved in the method, it is possible to bring about advantageous effects similar to those brought about by the content playback device.

An information providing program of the present embodiment is a program for (i) causing a computer to serve as any one of the content playback devices and (ii) causing the computer to serve as each means included in the content playback device.

By a computer executing the information providing program, it is possible to bring about advantageous effects similar to those brought about by the content playback device.

A storage medium of the present embodiment is a computer-readable storage medium in which the information providing program is stored.

By a computer executing the information providing program stored in the storage medium, it is possible to bring about advantageous effects similar to those brought about by the content playback device.

INDUSTRIAL APPLICABILITY

The present invention is applicable to (i) a content playback device, (ii) a television receiver, (iii) an information providing system, (iv) an information providing program, and (v) a storage medium, any of which is capable of providing an external device with additional information that is transmitted along with a broadcast content.

REFERENCE SIGNS LIST

10 Information providing system
100 Television (content playback device, television receiver, first device)
120 Mobile device (external device, second device)
140 Network
202 Receiving section (receiving means)
204 Decoding section
206 Decrypting section
208 Playback section
210 Display section
212 Audio output section
220 Unique information storing section
222 Processing section (processing means)
224 Transmitting section (additional information transmitting means)
226 Collecting section
228 Transmission command receiving section
302 Receiving section (additional information receiving means)
304 Decrypting section 306 Control section
308 Display section
310 Application running section
312 Searching section
314 Transmission command transmitting section

The invention claimed is:

1. A content playback device for playing back a broadcast content, comprising:
 receiving means for receiving additional information which is added to and transmitted along with the broadcast content;
 processing means for processing the additional information so that an external device can obtain information that is specific to unique information which the content playback device has; and
 additional information transmitting means for transmitting processed additional information to the external device,
 the unique information containing location information concerning a location of the content playback device,
 the additional information containing site information concerning a site relevant to the broadcast content; and
 the processing means processing the additional information so that the external device can obtain route information concerning a route from the location of the content playback device to the site.

2. A content playback device as set forth in claim 1, further comprising:
 a collecting section for collecting the additional information,
 the processing means processing additional information collected in the collecting section so that the external device can obtain, of the additional information collected in the collecting section, a piece of additional information specific to the unique information stored in the content playback device.

3. A television receiver comprising:
 a content playback device as set forth in claim 1.

4. A non-transitory computer-readable storage medium in which a program for causing a computer to operate as each means of a content playback device as set forth in claim 1 is stored.

5. An information providing system comprising:
 a first device; and
 a second device,
 the first device including
  receiving means for receiving additional information which is added to and transmitted along with a broadcast content,
  processing means for processing the additional information so that the second device can obtain information that is specific to unique information which the first device has, and
  additional information transmitting means for transmitting processed additional information to the second device,
 the unique information containing location information concerning a location of the first device,
 the additional information containing site information concerning a site relevant to the broadcast content; and
 the processing means processing the additional information so that the second device can obtain route information concerning a route from the location of the first device to the site, and
 the second device including
  additional information receiving means for receiving the additional information from the first device.

6. A method for providing, to an external device, additional information which is added to a broadcast content and is transmitted along with the broadcast content to a content playback device,
 said method comprising the steps of:
 (i) receiving the additional information;
 (ii) processing the additional information so that the external device can obtain information that is specific to unique information which the content playback device has; and
 (iii) transmitting processed additional information to the external device,
 the unique information containing location information concerning a location of the content playback device,
 the additional information containing site information concerning a site relevant to the broadcast content; and
 in the step (ii), the additional information being processed so that the external device can obtain route information concerning a route from the location of the content playback device to the site.

* * * * *